(12) United States Patent
Smith

(10) Patent No.: US 7,877,796 B2
(45) Date of Patent: Jan. 25, 2011

(54) METHOD AND APPARATUS FOR BEST EFFORT PROPAGATION OF SECURITY GROUP INFORMATION

(75) Inventor: Michael R. Smith, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1117 days.

(21) Appl. No.: 10/989,535

(22) Filed: Nov. 16, 2004

(65) Prior Publication Data

US 2006/0106750 A1    May 18, 2006

(51) Int. Cl.
| | |
|---|---|
| G06F 15/16 | (2006.01) |
| G06F 17/30 | (2006.01) |
| H04L 29/02 | (2006.01) |
| H04L 12/26 | (2006.01) |
| G06F 15/173 | (2006.01) |

(52) U.S. Cl. .............. 726/13; 726/14; 726/27; 713/166; 709/224; 709/225; 370/230; 370/235

(58) Field of Classification Search .............. 726/2, 726/3, 11–13, 16, 21, 26, 27; 713/150–154, 713/160–163, 168; 380/59, 255
See application file for complete search history.

(56) References Cited

U.S. PATENT DOCUMENTS

| | | | |
|---|---|---|---|
| 4,922,486 A | 5/1990 | Lidinsky et al. .............. 370/60 |
| 5,017,917 A | 5/1991 | Fisher ..................... 340/14.1 |
| 5,113,442 A | 5/1992 | Moir .......................... 713/167 |
| 5,251,205 A | 10/1993 | Callon et al. .............. 370/392 |
| 5,615,264 A | 3/1997 | Kazmierczak ............ 705/52 |
| 5,764,762 A | 6/1998 | Kazmierczak ............ 705/52 |
| 5,787,427 A | 7/1998 | Benantar et al. ........... 707/9 |
| 5,845,068 A | 12/1998 | Winiger ..................... 726/3 |
| 5,911,143 A | 6/1999 | Deinhart et al. .......... 707/103 |
| 5,941,947 A | 8/1999 | Brown ..................... 709/225 |
| 5,968,177 A | 10/1999 | Batten-Carew et al. ........ 726/4 |
| 6,014,666 A | 1/2000 | Helland ..................... 707/9 |

(Continued)

FOREIGN PATENT DOCUMENTS

EP    0 465 016 A2    6/1991

(Continued)

OTHER PUBLICATIONS

IEEE Standard for Information Technology-Telecommunications and Information Exchange Between Systems-Local and Metropolitan Area Networks-Common Specifications, *Part 3: Media Access Control (MAC) Bridges*, ANSI/IEEE Std. 802.1D, 1998 Edition, Dec. 10, 1998, pp. 1-355.

(Continued)

*Primary Examiner*—Nassar Moazzami
*Assistant Examiner*—Oscar A Louie
(74) *Attorney, Agent, or Firm*—Campbell Stephenson LLP

(57) ABSTRACT

A method and system for best effort propagation of security group information is disclosed. The method includes determining if a reserved group identifier is associated with a destination and, if the reserved group identifier is associated with the destination, indicating that a packet received at a network node can be sent to another network node. The packet includes destination information that identifies the destination as a destination of the packet.

70 Claims, 19 Drawing Sheets

U.S. PATENT DOCUMENTS

| | | | | |
|---|---|---|---|---|
| 6,023,765 | A | 2/2000 | Kuhn | 726/4 |
| 6,088,659 | A | 7/2000 | Kelley et al. | 702/62 |
| 6,092,191 | A | 7/2000 | Shimbo et al. | 713/153 |
| 6,202,066 | B1 | 3/2001 | Barkley et al. | 707/9 |
| 6,212,558 | B1 | 4/2001 | Antur et al. | 709/221 |
| 6,233,618 | B1 | 5/2001 | Shannon | 709/229 |
| 6,292,798 | B1 | 9/2001 | Dockter | 707/9 |
| 6,292,900 | B1 | 9/2001 | Ngo et al. | 726/6 |
| 6,304,973 | B1 | 10/2001 | Williams | 713/201 |
| 6,405,259 | B1 | 6/2002 | Cheston et al. | 709/245 |
| 6,449,643 | B1 | 9/2002 | Hyndman | 709/223 |
| 6,711,172 | B1 | 3/2004 | Li | 370/401 |
| 6,754,214 | B1 | 6/2004 | Mahalingaiah | 370/392 |
| 6,823,462 | B1 | 11/2004 | Cheng et al. | 726/15 |
| 6,973,057 | B1 | 12/2005 | Forslow | 370/328 |
| 6,985,948 | B2 | 1/2006 | Taguchi et al. | 709/225 |
| 7,000,120 | B1 | 2/2006 | Koodli et al. | 713/1 |
| 7,032,243 | B2 | 4/2006 | Leerssen et al. | 726/17 |
| 7,136,374 | B1 | 11/2006 | Kompella | 370/352 |
| 7,207,062 | B2 | 4/2007 | Brustoloni | 726/13 |
| 7,284,269 | B2 | 10/2007 | Marquet et al. | 726/13 |
| 7,350,077 | B2 | 3/2008 | Meier et al. | 713/171 |
| 7,417,950 | B2 | 8/2008 | Hofmeister et al. | 370/230 |
| 7,437,755 | B2 | 10/2008 | Farino et al. | 726/5 |
| 7,506,102 | B2 | 3/2009 | Lev-Ran et al. | 711/118 |
| 7,530,112 | B2 | 5/2009 | Smith | 726/28 |
| 2002/0026592 | A1 | 2/2002 | Gavrila et al. | 713/201 |
| 2002/0035635 | A1 | 3/2002 | Holden | |
| 2002/0184521 | A1 | 12/2002 | Lucovsky et al. | 713/200 |
| 2003/0051155 | A1 | 3/2003 | Martin | 726/11 |
| 2003/0088786 | A1 | 5/2003 | Moran et al. | 713/201 |
| 2003/0110268 | A1 | 6/2003 | Kermarec et al. | 709/227 |
| 2003/0140246 | A1 | 7/2003 | Kammer et al. | 713/201 |
| 2003/0145232 | A1 | 7/2003 | Poletto et al. | 726/2 |
| 2003/0154400 | A1 | 8/2003 | Pirttimaa et al. | 726/14 |
| 2004/0017816 | A1 | 1/2004 | Ishwar et al. | 370/395.53 |
| 2004/0044908 | A1 | 3/2004 | Markham et al. | 726/28 |
| 2004/0064688 | A1 | 4/2004 | Jacobs | 713/150 |
| 2004/0156313 | A1 | 8/2004 | Hofmeister et al. | 370/229 |
| 2004/0160903 | A1* | 8/2004 | Gai et al. | 370/254 |
| 2004/0181690 | A1 | 9/2004 | Rothermel et al. | 726/1 |
| 2004/0202171 | A1 | 10/2004 | Hama | 370/395.1 |
| 2004/0264697 | A1 | 12/2004 | Gavrilescu et al. | 370/229 |
| 2004/0268123 | A1 | 12/2004 | Le et al. | 713/160 |
| 2005/0055573 | A1 | 3/2005 | Smith | 713/201 |
| 2005/0097357 | A1 | 5/2005 | Smith | 713/201 |
| 2005/0129019 | A1* | 6/2005 | Cheriton | 370/392 |
| 2005/0177717 | A1 | 8/2005 | Grosse | 713/160 |
| 2005/0190758 | A1 | 9/2005 | Gai et al. | 370/389 |
| 2005/0198412 | A1 | 9/2005 | Pedersen | 710/30 |
| 2006/0010483 | A1 | 1/2006 | Buehler et al. | 726/1 |
| 2006/0090208 | A1 | 4/2006 | Smith | 726/26 |
| 2006/0106750 | A1 | 5/2006 | Smith | 707/1 |
| 2006/0112425 | A1 | 5/2006 | Smith et al. | 726/13 |
| 2006/0112426 | A1 | 5/2006 | Smith et al. | 726/13 |
| 2006/0112431 | A1 | 5/2006 | Finn et al. | 726/22 |
| 2006/0117058 | A1 | 6/2006 | Smith | 1/1 |
| 2007/0094716 | A1 | 4/2007 | Farino et al. | 726/5 |
| 2009/0049196 | A1 | 2/2009 | Smith et al. | 709/245 |
| 2009/0097490 | A1 | 4/2009 | Sanderson et al. | 370/395.53 |

FOREIGN PATENT DOCUMENTS

| | | | |
|---|---|---|---|
| EP | 0 697 662 A1 | 2/1996 | |
| EP | 0 849 680 A2 | 12/1997 | 12/14 |
| EP | 1 067 745 A2 | 11/1999 | |
| JP | 2002 164937 | 6/2002 | |
| WO | WO 2005/027464 | 3/2005 | |

OTHER PUBLICATIONS

Computer Systems Laboratory, National Institute of Standards and Technology, *Standard Security Label for Information Transfer*, Federal Information Processing Standards Publication 188 (FIPS PUB 188), Category: Computer Security, Subcategory: Security Labels, Sep. 6, 1994, pp. 1-25.

Smith, Michael R., pending U.S. Patent Application entitled "Method and System for Generating User Group Identifiers," U.S. Appl. No. 10/970,532; filed Oct. 21, 2004, including Specification, Claims and Abstract: pp. 1-44; Drawings: Figures 1A-13C on 14 sheets.

Wang, Ning and Pavlou, George, Scalable Sender Access Control for Bi-directional Multicast Routing, Computer Networks, Elsevier Science Publishers B.V., vol. 43, No. 5, Dec. 5, 2003, pp. 539-555.

Islam, An Access Control Method with Subject-Object Key and Time Stamp, Jun. 2003, Malaysian Journal of Computer Science, vol. 16, No. 1, pp. 77-83.

Barkley et al, Supporting Relationships in Access Control Using Role Based Access Control, Jul. 1999.

Pfleeger et al., Security in Computing, 2003, Prentice Hall, 3$^{rd}$ Edition, pp. 194-207.

Valenzi, Kathleen D., Digital Signatures: An Important "Sign" of the Future of E-Government Copyright 2000 The Rector and Board of Visitors of the University of Virginia, 6 pages.

Microsoft Computer Dictionary, Fifth Edition, Pub Date: May 1, 2002, Excerpt of terms: digital signature—digital signature standard & routable protocol—routing table, p. 656.

CDAT Overview, http: www.cisco.com/universalcd/cc/td/doc/, Solution/sesm/sesm_313toolguid/chi1_overview.htm. Copyright 1992-2002 Cisco Systems, Inc.

Stevens, Richard W., TCP/IP Illustrated vol. I, The Protocols, Copyright © 1994 Addison Wesley Longman, Inc., pp. 112-117.

Smith, Michael R.. pending U.S. Patent Application entitled "Method and Apparatus for Providing Network Security Using Rose-Based Access Control," U.S. Appl. No. 10/659,614; filed Sep. 10, 2003, including Specification, Claims and Abstract: pp. 1-57; Drawings: Figures 1-14 on 16 sheets.

Valenzi, Kathleen D., Digital Signatures: An Important "Sign" of the Future of E-Government, Copyright 2000 the Rector and Board of Visitors of the University of Virginia.

\* cited by examiner

Fig. 3

Access Control List 300

| Flow Label Field | SSG Field | DSG Field | Other Flow Specification Fields |
|---|---|---|---|
| 320(1) | 330(1) | 340(1) | 350(1) |
| 320(2) | 330(2) | 340(2) | 350(2) |
| 320(3) | 330(3) | 340(3) | 350(3) |
| 320(4) | 330(4) | 340(4) | 350(4) |
| ... | ... | ... | ... |
| 320(N-1) | 330(N-1) | 340(N-1) | 350(N-1) |
| 320(N) | 330(N) | 340(N) | 350(N) |

Access Control List Entry 310(1), 310(2), 310(3), 310(4), ..., 310(N-1), 310(N)

METHOD AND APPARATUS FOR BEST EFFORT PROPAGATION OF SECURITY GROUP INFORMATION

BACKGROUND OF THE INVENTION

1. Field of the Invention

This invention relates to the field of information network security, and more particularly relates to a method and apparatus for processing network traffic using security group information.

2. Description of the Related Art

Flexible network access technologies such as wireless, Dynamic Host Configuration Protocol (DHCP), virtual private network (VPN) gateways and the like allow users access to a given protected network from a variety of access or entry points. This is true of all manner of networks, including enterprise networks, service provider networks and the like. At the same time, the security afforded while providing such access is of increasing concern. Technologies based on Remote Authentication Dial-In User Service (RADIUS), Terminal Access Controller Access Control System (TACACS) and other protocols allow a user to be authenticated upon entry to the network.

As is known, communications paths across such networks are conceptually separate (e.g., can be viewed as separate virtual paths), although they may traverse some or all of the same network devices (i.e., physical segments), and so are controlled separately using, for example, access control lists (ACLs). Conventionally, constraints upon access enjoyed by network users are enforced by ACLs, which are used to process packets and so control the network traffic of such users. For scalability and manageability, conventional ACLs require the mapping of a user host address (as the source of the given packet(s); for example, an internet protocol (IP) address) to be relatively static, or the security policy be sufficiently lax to allow all possible addresses possible for the user.

Today's security ACLs suffer from a number of infirmities. These ACLs are conventionally applied to a given interface and contain IP addresses which tie the security policy directly to the network topology. As a result, a change in the network such as repartitioning of sub-nets causes the security policy to be revisited. Moreover, it would appear that ACLs in various parts of the network would need to be updated each time a user authenticated to the network, in order to add rules associated with the source IP address assigned to this user's host, which would be specific to that user. This would cause a huge increase in the number of unique ACLs and dramatically increase the rate at which such rules would have to be updated. Within a given ACL, there also exists the problem of dramatic increases in size resulting from the expression of individual IP addresses, where the number of entries is often the number of source addresses multiplied by the number of destination addresses, multiplied by the number of permissions. Thus, the addition of a single individual IP address can have a significant impact on the size of a substantial number of ACLs.

When a customer changes the network topology, the ACLs must be reexamined. Since such ACLs can quite easily reach several hundred or even several thousand of lines in length, such a reexamination can be non-trivial, to say the least. Due to the complexity of such an ACL, the confidence in the changes that are made is not very high, typically, and the ACLs often require extensive testing by the user before being placed in a production environment. Moreover, because platforms using content-addressable memories (CAMs) to implement ACLs require recompiling of some or all of the ACLs when any change is made, the increases in processing cost can be quite severe, approaching a quadratic in the number of users. These increases in complexity increase the chance of a network outage, a security hole, or both. A single ACL stretches a user's ability to manage their security policy. Placing such ACLs throughout the enterprise network therefore impacts the manageability of today's networks. Given the foregoing, particularly in light of the increasingly flexible access that is required now and will be required in the future, relying on existing ACL-based solutions is difficult.

Compounding this problem is the often belated application of such ACLs, which typically occurs at the network edge on the egress side of the network. Because the ACLs of a sub-net are known to the egress router coupled to that sub-net, application of those ACLs is performed by that egress network device (or more simply egress node (e.g., an egress router)). This results in packets being sent across the core of the network, only to be discarded at the egress node. Thus, the network core is forced to carry a significant amount of traffic unnecessarily.

What is required, then, is a mechanism that allows for the efficient identification of network traffic to a given destination, and does so earlier in a packet's traversal of the network (i.e., before the packet reaches the packet's egress node). Preferably, such an approach should be compatible with existing ACL technology, as well as future ACL technology, thus reducing or eliminating the problem of multiplicative ACL growth. Also preferably, such an approach should allow the network to be easily reconfigured and grow, without incurring a disproportionate administrative burden or consuming inordinately large amounts of network resources. Such an approach should also minimize the amount of unnecessary network traffic.

BRIEF DESCRIPTION OF THE DRAWINGS

The present invention may be better understood, and numerous objects, features, and advantages made apparent to those skilled in the art by referencing the accompanying drawings.

FIG. 3 is a diagram illustrating an example of an access control list (ACL) according to embodiments of the present invention.

The use of the same reference symbols in different drawings indicates similar or identical items.

DETAILED DESCRIPTION OF THE INVENTION

Figure 1:
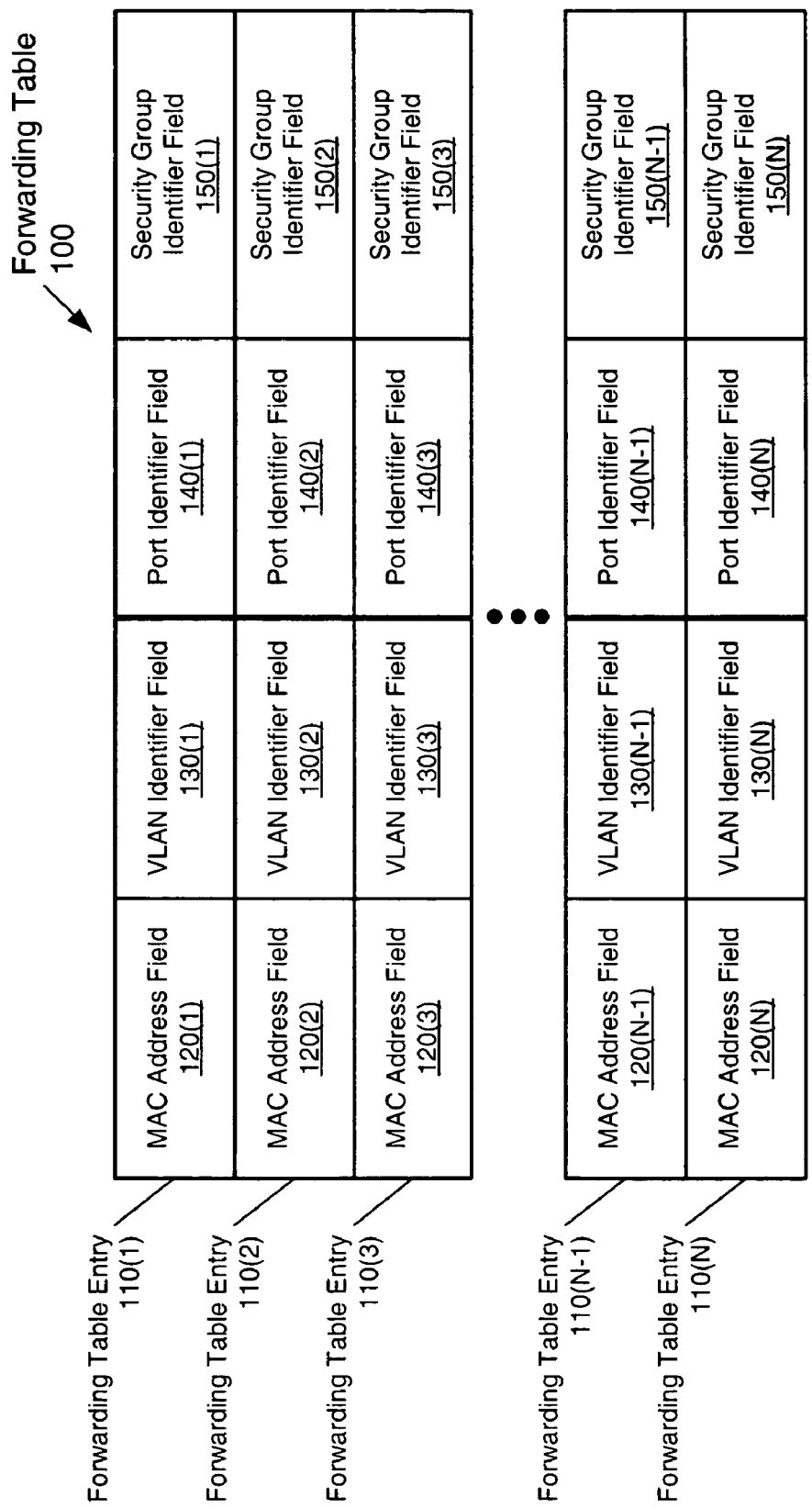
FIG. 1 is a diagram illustrating a forwarding table according to embodiments of the present invention.

The following is intended to provide a detailed description of an example of the invention and should not be taken to be limiting of the invention itself. Rather, any number of variations may fall within the scope of the invention which is defined in the claims following the description.

Introduction

The present invention provides a method and apparatus that addresses the limitations outlined above through the use of role-based access control lists (RBACLs) in conjunction with a "best-effort" technique that pushes the point at which RBACLs are applied, from a packet's egress node to a point nearer to the packet's ingress node. RBACLs control network traffic by enforcing the permissions to be applied to that network traffic, based on the role(s) of a packet's source and destination. By moving the point at which a given RBACL is applied (i.e., with regard to permitting or denying of a packet), the present invention reduces the amount of network traffic within the network core.

A method and apparatus according to the present invention represent the aforementioned roles using security groups in the context of a network (e.g., an enterprise network). In so doing, the present invention provides a basis for network security. Authenticated network entities (hosts, servers, internet protocol (IP) telephones and the like) are assigned to a specific security group for the purpose of making access control decisions, based on their role(s) within the organization (and so, network). As a packet traverses the network, the packet carries information regarding the security group membership of the packet's source in the form of security group information (e.g., a security group identifier such as a source group tag (SGT)), which can be cryptographically authenticated if such encryption is supported by the network. This security group information is used to perform access control processing on the egress edge of the network, using the security group membership of the packet's destination. Ideally, access control would be performed at the ingress node. However, it is reasonable to expect that this would entail the ingress node's obtaining group membership for every destination, which can present challenges with regard to scalability and the like.

In one embodiment, en entity (e.g., a user) is given membership in one or more security groups based on that user's role(s). Each security group may represent one role, or a number of roles. In turn, permission lists implementing network security policies are applied in deciding whether to permit communication between entities on the network. This information can then be used to make a determination as to the handling of a packet sourced by a given entity. For example, when a packet is sourced onto the network, information regarding the source's group is inserted into the packet. Communication of this information (also referred to herein as a security group tag, or more simply, a tag) can be implemented in a number of ways. For example, the information can be implemented as a source group tag (a tag indicating the group to which the source belongs) that is inserted into the packet in some manner, although other methods can be employed.

As will be appreciated, network devices with the same group membership often tend to be grouped together (i.e., web servers tend to be grouped together in a server farm). Users tend to be physically grouped together based on group membership (i.e., members of an engineering group tend to office in the same building(s)). By exploiting this natural tendency in networks, when available, group membership can be propagated into the network in a best effort manner. This is particularly effective when group memberships map closely to the network topology.

As the packet traverses the network, the source group information is carried along with the other information in the packet. At the egress edge of the network, the destination group can be derived. For example, at the "L3" edge (the network device at the edge of the layer 3 network in a network implementing the Open System Interconnect (OSI) model), the destination group can be derived from the network device's forwarding information base (FIB) via the fully resolved host prefix. The host prefix is resolved through the address resolution protocol (ARP). The ARP response is tagged with the destination group when the packet is sourced onto the network. The FIB result is populated with the destination group in addition to the rewrite information. Once the source and destination groups have been determined, the permissions (the relevant ACL entry) can be determined by the egress node.

However, as noted, making this determination closer to the ingress node (and preferably, as close as possible to the ingress node) is desirable for a number of reasons. To propagate the security group tag into the network, the present invention provides mechanisms to propagate group membership information along a packet's route, from the packet's egress node, toward the packet's ingress node. For example, layer 3 (L3) routing protocols (within the OSI model) can be modified to allow for the transmission of security group information (e.g., a source group tag (SGT)) along with route update information propagated as part of the L3 protocol.

The present invention provides a number of advantages. As noted, the present invention reduces the demand for processing and network bandwidth by reducing the amount of network traffic that the network must carry. The present invention also provides a scaleable method of propagating group membership when the group membership aligns with the network topology. The present invention does not require additional hardware support (in comparison to network hardware that does not support the present invention). Moreover, the present invention does not require network topology changes, and is able to dynamically adapt to changes within the network. The present invention also provides advantages to the customer, including a certain level of resistance to distributed denial of service (DDOS) attacks, bandwidth savings in the core of the enterprise network, and prevention of reconnaissance attacks such as ping sweeps and the like, with no impact to hardware cost and minimal software overhead.

The Implementation of Roles in an Authentication Architecture

In one embodiment of the present invention, hierarchical security groups (SGs) are defined to include a number of groups, each having a hierarchical relationship to one or more other groups. Each child group inherits permissions from its parent group and extends those permissions with its own. Typically, a user in a child security group will have access to more of the computing and informational resources of the organization than will a user in parent security group. As will be apparent, the further one traverses down in a security group hierarchy, in one embodiment, the greater the level of responsibility, and so, the greater the amount of access.

Alternatively, disjoint SGs can be used where there are non-overlapping, equal, and non-related functions. In the actual implementation of RBACLs, hierarchical SGs can be implemented using disjoint SGs and the hierarchy management (if present) can be made the responsibility of the network management entity responsible for configuring the RBACLs. Such disjoint SGs are used in situations in which there are non-overlapping, equal and non-related functions performed by the groups in question. Because the responsibilities of each of these groups is so different and distinct from that of the other groups, each of these groups would be expected to have their own set of resources, accessible by members of the given group. Thus, it would expected that the users in a given security group would maintain the same set of permissions, allowing them access to the same set of resources, although this need not strictly be the case.

It will be appreciated that groups of users are put into the same group because they share the same permissions. This creation of groups does not imply that no communications occur between or across security groups. Nor does this imply that there is no permission enforcement within a given group. It simply implies that as a group, the users will have substantially the same privileges within the network.

More detailed examples of security group hierarchies and disjoint security groups are given in patent application Ser. No. 10/659,614, filed Sep. 10, 2003, and entitled "Method and Apparatus for Providing Network Security Using Role-Based Access Control," having Michael R. Smith as inventor, which is hereby incorporated by reference herein, in its entirety and for all purposes.

The implementation of RBACLs typically includes a number of operations. These operations include 1. Source Security group (SSG) determination
2. Destination Security group (DSG) determination
3. Permissions determination
4. Permissions enforcement These operations are described in connection with FIGS. 1-7, below.

FIG. 1 is a block diagram illustrating a forwarding table 100 according to the present invention. Forwarding table 100 includes a number of forwarding table entries (depicted in FIG. 1 as forwarding table entries 110(1)-(N)). Each of forwarding table entries 110(1)-(N) includes a number of fields, certain of which are depicted in FIG. 1. Among these fields are a MAC address field (depicted as MAC address fields 120(1)-(N)), a virtual local area network (VLAN) identifier field (depicted as VLAN identifier fields 130(1)-(N)), a port identifier field (depicted as port identifier fields 140(1)-(N)), and a security group identifier field (depicted as security group identifier fields 150(1)-(N), which are capable of holding security group information such as an SGT).

When the media access control (MAC) address and VLAN have been authenticated on a given port, the security group information retrieved during the authentication process is assigned to the MAC address/VLAN identifier combination. This information appears in forwarding table 100 in MAC address fields 120(1)-(N) and VLAN identifier fields 130(1)-(N). Forwarding table 100 thus contains the MAC address/VLAN identifier combinations that can be used as a look-up key with the result of the look-up providing the port identifier (as stored in the appropriate one of port identifier fields 140(1)-(N)) and the security group information (e.g., a security group identifier stored in a corresponding one of security group identifier fields (150(1)-(N)).

It will be noted that, in one implementation, when a packet is sent by a host, the layer 2 learning look-up (provided as part of the rigging function in the network switch that maintains forwarding table 100) also derives security group information (e.g., a security group identifier) for the packet by looking up the packet's contents in the forwarding table. Alternatively, the switch's layer 2 learning look-up can be designed to extract the security group information from the packet itself. This security group information is used to tag the packet for identification as having been generated by a user in the given security group (such a tag is thus referred to herein as a source group tag (SGT)). The security group information is inserted into the packet for use in the subsequent processing of the packet. For example, the security group information can be inserted into the layer 2 header, making such information available to layer 3 routers, as well as layer 2 switches.

It will be noted that the variable identifier "N" is used in several instances in the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements has the same number of elements as another series delimited by the same variable identifier. Rather, in each instance of use, the variable identified by "N" (or any other such identifier) may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Before the appropriate RBACL can be applied, a determination is also made as to the destination security group. While a number of mechanisms can be used to make such a determination, two ways to determine the DSG of the object (server) are now discussed. As will be appreciated, each has its own advantages in certain scenarios.

The first mechanism to determine a DSG employs information in the forwarding information base (FIB) provided during address resolution by the address resolution protocol (ARP) (i.e., the IP FIB). For most cases involving network traffic using IP, the destination security group can be derived from the FIB. On the egress network layer 3 (L3) edge of the network, the FIB will be populated with the resolved host prefix after ARP resolution is performed. Since the ARP response is the trigger for the FIB entry update and needs to be received before any traffic flows to the host, the ARP response is used as the trigger to insert information regarding the destination's security group into the FIB entry.

Alternatively, the destination security group can be determined via a static ingress ACL. As will be appreciated, when connecting an RBACL-enabled network to a non-RBACL-enabled network, the authentication infrastructure will not be present in the non-RBACL-enabled network. In a manner similar to assigning the source security group described previously, the destination security group needs to be classified via the same mechanism in such situations. By using the ingress ACL to provide the destination security group classification, the destination IP addresses/sub-nets can indicate the destination security group to determine the correct RBACL to apply. It will be noted that the egress ACL may also be used, so long as the DSG determination occurs before the RBACL enforcement.

An Example of a Software-Based Permissions Architecture

Figure 2:
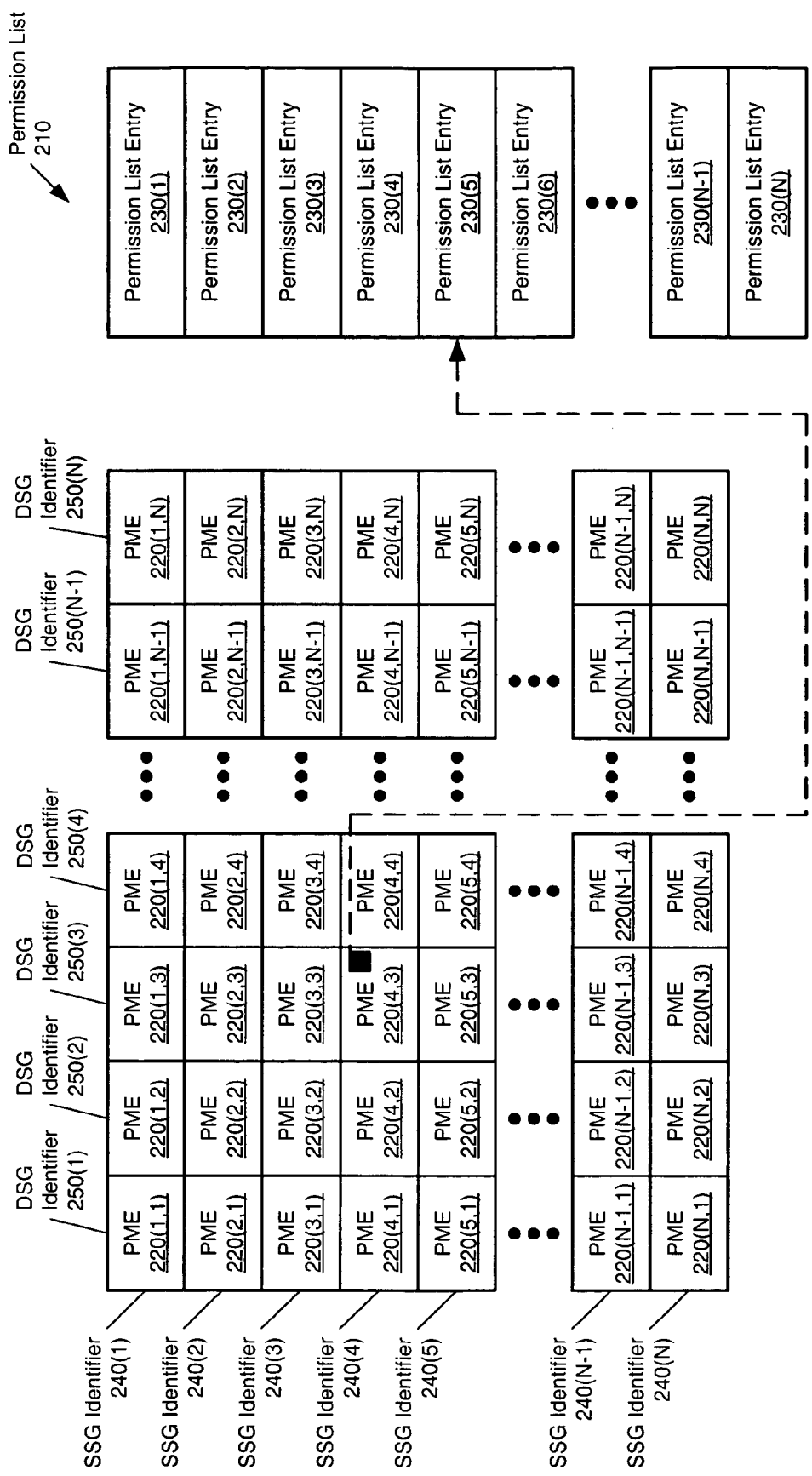
FIG. 2 is a block diagram illustrating a permissions matrix according to embodiments of the present invention.

FIG. 2 is a block diagram illustrating a permissions matrix 200 and a permission list 210, according to the present invention. Each of the entries in permissions matrix 200 (depicted as permissions matrix entries 220(1,1)-(N,N)) point to one of the entries in permission list 210 (depicted as permission list entries 230(1)-(N)). Each of permissions matrix entries (PME) 220(1,1)-(N,N) is indexed by one of a number of source security group identifiers 240(1)-(N) and one of a number of destination security group (DSG) identifiers 250 (1)-(N). As will be apparent, each of source security group (SSG) identifiers 240(1)-(N) corresponds to a row in permissions matrix 200, while each of destination security group identifiers 250(1)-(N) corresponds to a column in permissions matrix 200. Each of permission list entries 230(1)-(N) provides a list of permissions as to the kinds of network traffic that are permitted between the source security group and destination security group. For example, given a source security group identifier of four (4) and a destination security group identifier of three (3), PME 220(4,3) is identified. PME 220(4,3) includes a pointer to permission list entry 230(5). Examples of permission lists and data structures therefor are given in patent application Ser. No. 10/659,614, entitled "Method and Apparatus for Providing Network Security Using Role-Based Access Control," as previously included by reference herein.

Thus, in a software based implementation, a tree-based, hash-based, or other such lookup structure can be employed, with the lookup being a match on the concatenation of the source and destination security groups. The result of the lookup is a pointer to a chain of ACLs. These ACLs are traversed in the order they are present in the chain. The ACLs are viewed logically as a single chained ACL.

In many ACL implementations, two approaches are typically employed. One approach is the network processor-based (software) model. This type of implementation is similar to the software implementation and may benefit from that approach. The other approach is using a CAM-based solution. The following section focuses on the CAM-based implementation.

An Example of a Hardware-Based Permissions Architecture Implemented Using Role-Based Access Control Lists A CAM-based implementation provides the advantage of a parallel lookup and the ability to mask fields. Parallel lookup provides high, predictable, and consistent performance. Unfortunately, the single lookup generally creates a significant amount of complexity for software programming of the device, because the typical implementation assumes sequential processing.

The permission matrix can also be implemented in an ASIC using on-chip memory, although it is preferable that the number of groups supported by a platform be relatively small (e.g., less than 256). In such a scenario, the output of the matrix provides a label (e.g., a flow label) which can then be used to perform a CAM lookup in a manner similar to that of traditional CAM-based ACL implementations. The likely case, however, is that the number of groups to be supported will be much larger, making an on-chip implementation infeasible. The permissions determination and permissions enforcement are thus typically implemented together within the CAM lookup itself Using a single flow label for the RBACL lookup, the source and destination groups can be placed in the CAM flow specification in the place of the source and destination network addresses (e.g., IP addresses).

FIG. 3 is a block diagram illustrating an example of an access control list (ACL) according to the present invention, and depicted as access control list 300. Access control list 300 includes a number of entries (referred to as access control list entries or ACEs), which are depicted in FIG. 3 as access control list entries 310(1)-(N). Each of ACEs 310(1)-(N) include, for example, a flow label (depicted in FIG. 3 as flow label fields 320(1)-(N)), a source security group (SSG) identifier (depicted in FIG. 3 as SSG fields 330(1)-(N)), a destination security group (DSG) identifier (depicted in FIG. 3 as DSG fields 340(1)-(N)), and other flow specifications (depicted in FIG. 3 as other flow specification fields 350(1)-(N)). As is known, an ACL such as ACL 300 can be implemented using a content-addressable memory (CAM), and more specifically, a ternary CAM (TCAM), thereby providing for the fast and efficient look-up of information. An optional flow label (also referred to as an ACL label, maintained in the appropriate one of flow label fields 320(1)-(N)) is provided to distinguish RBACLs from traditional interface ACLs in the same device. A device employing only RBACLs would not need such a field.

An Example of a Network Employing RBACLs

Figure 4:
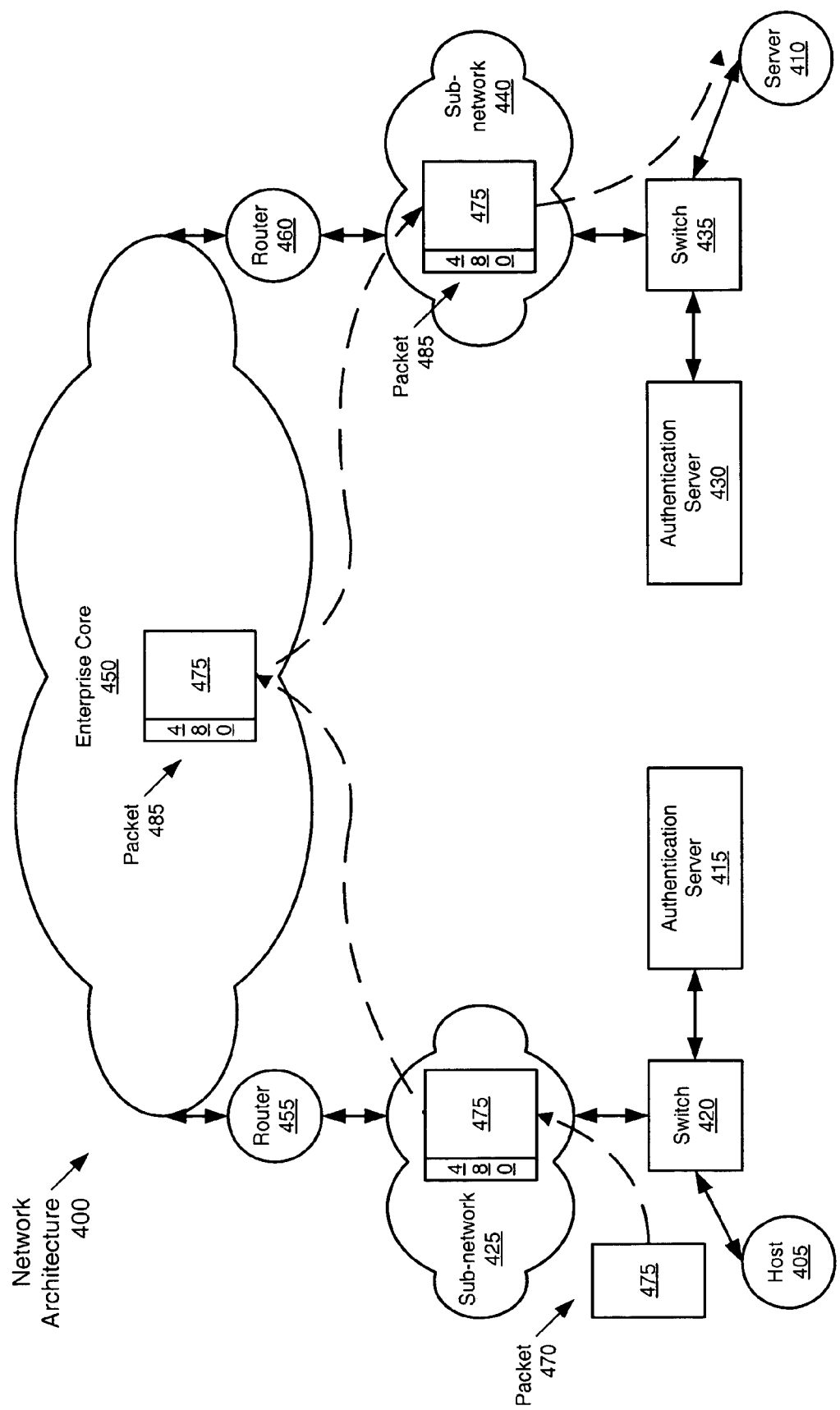
FIG. 4 is a block diagram illustrating an example of a network architecture including a host and a server, according to embodiments of the present invention.

FIG. 4 is a block diagram illustrating an example of a network architecture 400 that includes a host 405 and a server 410. Host 405 is authenticated by an authentication server 415 via a switch 420, in the manner discussed in patent application Ser. No. 10/659,614, entitled "Method and Apparatus for Providing Network Security Using Role-Based Access Control," as previously included by reference herein. Switch 420 also provides host 405 access to a sub-net 425. Server 410 is authenticated by an authentication server 430 via a switch 435, again in the manner discussed in patent application Ser. No. 10/659,614, entitled "Method and Apparatus for Providing Network Security Using Role-Based Access Control," as previously included by reference herein. Switch 435 also provides server 410 access to (and from) a sub-net 440. Sub-nets 425 and 440 are communicatively coupled to one another via an enterprise core 450. Sub-net 425 accesses enterprise core 450 via a router 455, and similarly, sub-net 440 access enterprise core 450 via a router 460.

Also shown in FIG. 4 is a packet 470, having contents 475. Packet 470 is transmitted by host 405 to switch 420. Source security group information is added to packet 470 by switch 420 in the form of security group information (SGI) 480 (which can be implemented, for example, as a source group tag (SGT)), based on information provided by authentication server 415 during the authentication process, in order to create a packet 485. As is depicted in FIG. 4, packet 485 includes both contents 475 and SGI 480. Packet 485 traverses sub-net 425 and arrives at router 455. Router 455 routes packet 485 across enterprise core 450 to router 460. Router 460 presents packet 485 to switch 435 (and thus, server 410) via sub-net 440. Switch 435 makes a determination as to whether to pass packet 485 to server 410 based, at least in part, on the DSG information provided to server 410 by authentication server 430. It will be appreciated that, alternatively, router 460 could also be tasked with, and make, this determination.

A specific example of the traversal of network architecture 400 by packet 470/packet 485 is now given. After authentication, host 405 can send packets (e.g., packet 470) on the network. Since RBACLs are being applied at network layer 3 in the present example, any packets the user attempts to send beyond his local sub-net (e.g., sub-net 425) will be subject to RBACL inspection. As will be appreciated, switches 420 and 435 can also employ RBACLs in the layer 2 domain (e.g., within sub-nets 425 and 440, respectively).

If packet 485 is the first packet to be sent from host 405 to server 410, an ARP process will be triggered for the destination. The sending of packet 485 begins with the SSG (in this case, with a value of 5) being taken from SGI 480. A FIB lookup in router 455 for a packet has the destination of packet 485 indicates the next hop router to which the packet should be forwarded. This Next Hop Information could be, for example, either the MAC rewrite information for router 460, or that for a router between router 455 and router 460. It will be noted that, in this example, the prefix information is contained in a CAM, while the security group and next hop information are contained in a standard memory (e.g., SRAM). The lookup is performed by using the prefix to determine which entry in memory to inspect.

When packet 475 (later packet 485) is sent from host 405, packet 475 is untagged, as noted. In this example, upon entering switch 420, packet 475 is tagged with SGI 480 (which indicates a security group of 5). This security group is retrieved from the layer 2 table in the ingress switch (switch 420) in the manner discussed previously. This packet (which is, now including SGI 480, referred to as packet 485) is then sent through network architecture 400 via the routing and switching provided thereby.

At the egress router (router 460), FIB lookup is performed. If the FIB lookup hits a locally-attached sub-net, the glean adjacency causes an ARP request to be generated for the desired server (e.g., server 410). The ARP request is sent from router 460 to server 410. The ARP response is then sent from server 410. The ingress L2 switch (switch 435) inserts the SSG for server 410 (or, as used by the switches/routers of network architecture 400 (e.g., host 405) as the DSG for packets sent to server 410; which is set to a security group of 6) into the ARP response (in the L2 header). Router 460 receives the ARP response and populates the FIB with the resolved host prefix, the rewrite information containing the MAC address of the host, and the destination security group (6) from the ARP response.

In the case where packet 485 is a subsequent packet from host 405 to server 410, the tables in question should already be populated. Once the FIB of router 460 contains the fully resolved host prefix, the next packet to server 410 will be subject to access control. (In the embodiment of the present invention in this example, the first packet that triggered the ARP resolution is dropped.) When the subsequent packet arrives from host 405 arrives at router 460, router 460 already possesses the information relating to the pertinent source and destination groups. The SSG (with a value of 5) is extracted from the subsequent packet's SGT and the DSG (with a value of 6) is discovered by the FIB lookup.

At this point, an ACL lookup can be performed. Assuming a CAM-based implementation is employed, the lookup key into the CAM contains the packet information as well as the source and destination security groups (with values of 5 and 6, respectively). In this example, the only allowed permission between the 2 groups is web traffic (tcp port 80). As will be appreciated, it is desirable to perform this access control processing earlier in the route of a packet being conveyed through the network. Such functionality is described below in connection with FIGS. 8, 9, 10, 11, 12, 13, 14, 15, 16, 17, 18 and 19.

Since, in this example, the subsequent packet is indeed web traffic (destined for TCP port 80), the appropriate CAM entry is hit and transmission of the packet to sub-net 440 (and so, on to server 410 via switch 435) is permitted. However, to illustrate further, if the subsequent packet had been a Telnet packet (destined for TCP port 23), the packet would hit the ANY-ANY entry in the CAM, which would not permit such transmission (effectively implementing the implicit deny present in software ACLs). A more generalized discussion of the operations described in the preceding passages is now presented in connection with FIGS. 5, 6, and 7.

An Example of the Operation of a Network Employing RBACLs

Figure 5:
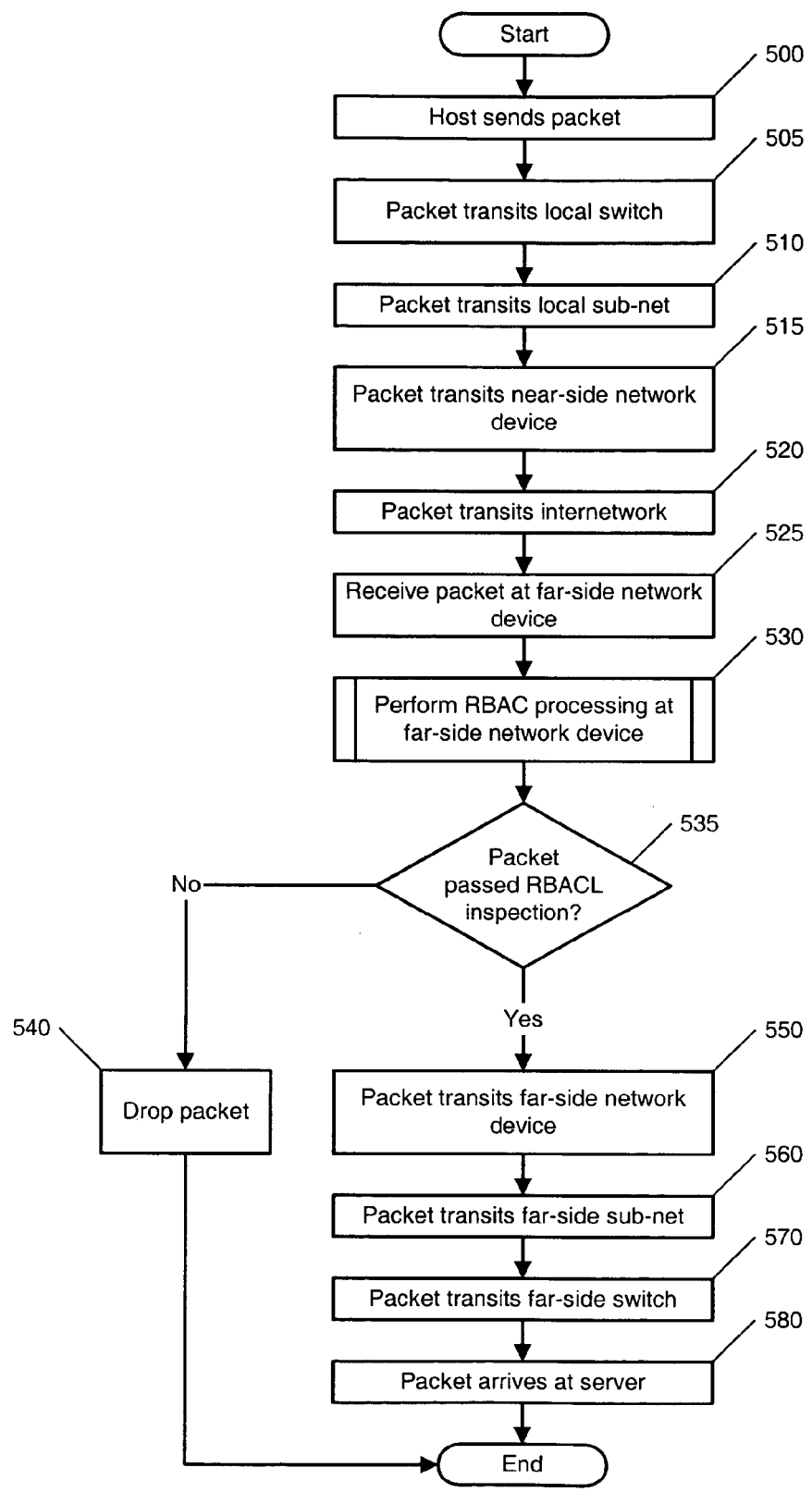
FIG. 5 is a flow diagram illustrating an example of a packet's traversal through the network architecture shown in FIG. 4 and processing performed thereon according to embodiments of the present invention.

FIG. 5 is a flow diagram illustrating a generalized example of the process of a packet's traversal through a network such as that depicted as network architecture 400. In such a scenario, the process begins with host 405 sending a packet (e.g., packet 470) (step 500). The packet thus transmitted transits the local switch (e.g., switch 420), which tags the packet with source security group information (e.g., an SGT) (step 505). The target packet (e.g., packet 485) then transits the local sub-net (e.g., sub-net 425) (step 510). After transiting the local sub-net, the packet transits the near-side network device (e.g., router 455) (step 515). At this point, as noted, router 455 routes the packet across the given internetwork (e.g., enterprise core 450) (step 520). After transiting the internetwork, the packet is received by the far-side network device (e.g., router 455) (step 525). At the far-side network device, role-based access control processing is performed (step 530). Such processing is described in detail in connection with FIGS. 6 and 7.

A determination is then made as to whether the given packet has passed the RBAC processing that is performed (step 535). If the packet fails to pass the RBAC inspection (i.e., the RBAC processing that was performed), the packet is dropped (step 540). As will be apparent to those skilled in the art, other actions may be performed in response to such an outcome. Alternatively, if the given packet passes RBAC inspection (step 535), the packet is allowed to transit the far-side network device (step 550), and then transits the far-side sub-net (e.g., sub-net 440) (step 560). The packet then transits the far-side switch (e.g., switch 435) (step 570). Finally, the packet arrives at the destination server (e.g., server 410) (step 580).

As noted, FIG. 5 depicts a flow diagram illustrating a process according to an embodiment of the present invention, as do other of the flow diagrams discussed herein. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

The software modules described herein may be received by such a computer system, for example, from computer readable storage media. The computer readable storage media may be permanently, removably or remotely coupled to the computer system. The computer readable storage media may non-exclusively include, for example, any number of the following: magnetic storage media including disk and tape storage media. Optical storage media such as compact disk media (e.g., CD-ROM, CD-R, etc.) and digital video disk storage media nonvolatile memory storage memory including semiconductor-based memory units such as FLASH memory, EEPROM, EPROM, ROM or application specific integrated circuits. Volatile storage media including registers, buffers or caches, main memory, RAM, and the like. In a UNIX-based embodiment, the software modules may be embodied in a file which may be a device, a terminal, or a local or remote file. Other new and various types of computer-readable storage media may be used to store the software modules discussed herein.

Figure 6:
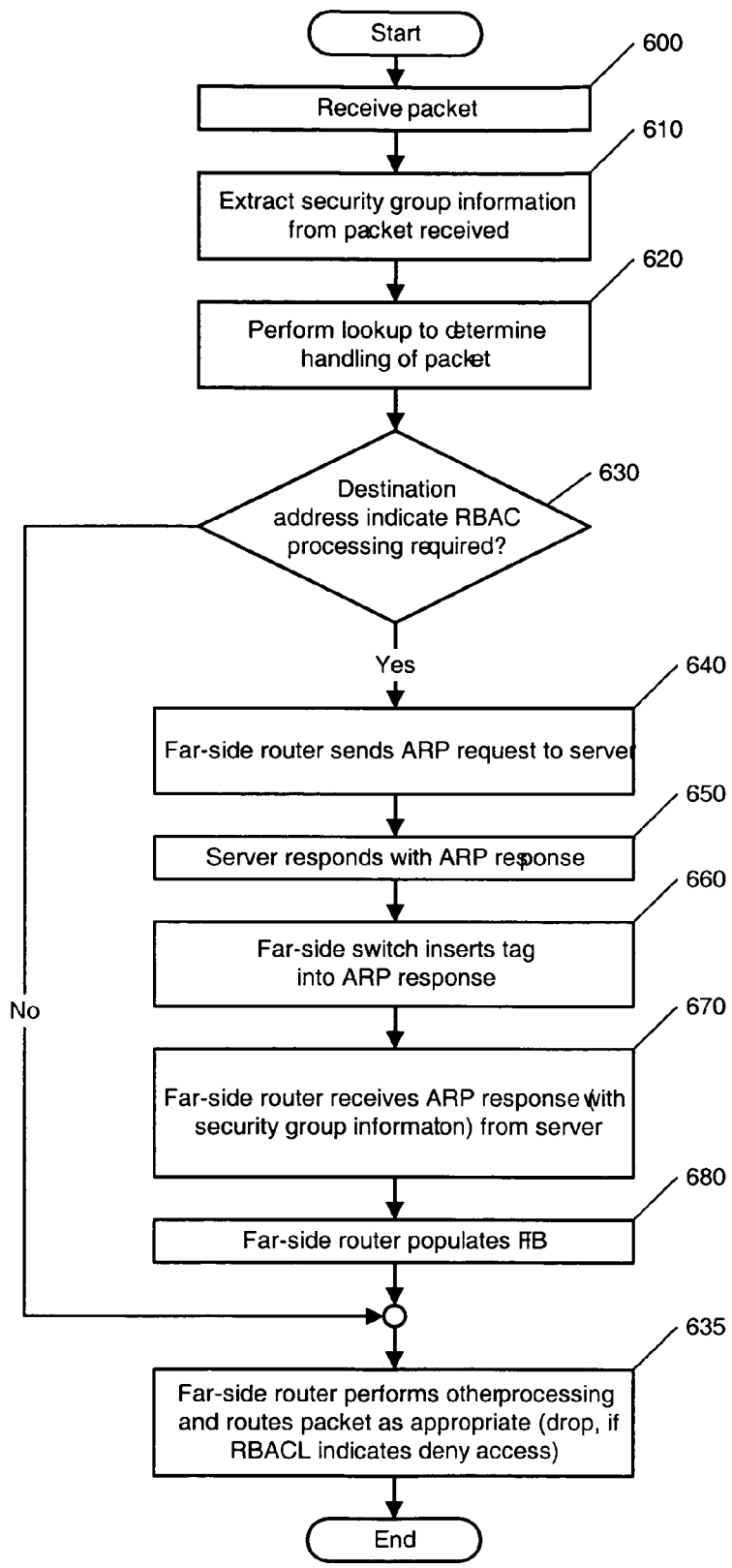
FIG. 6 is a flow diagram illustrating an example of processing performed on a packet subject to role-based access control (RBAC) processing according to embodiments of the present invention, where the packet is the first such packet received.

FIG. 6 is a flow diagram illustrating an example of the RBAC processing performed on the packet by a network device such as router 460, in the case in which the packet is the first such packet received. The process begins with the receipt of a packet to be processed using the present invention (step 600). First, the packet's security group information is extracted (step 610). Next, a look-up is performed to determine how the packet should be handled (step 620). A determination is then made as to whether the destination address of the given packet indicates that RBAC processing is required (step 630). If the destination address indicates that RBAC processing is not required, the far-side router performs other processing on the packet, as required, and routes the packet as appropriate (step 635).

However, if the packet's destination address indicates that RBAC processing is to be performed, the far-side router sends an address resolution protocol (ARP) request to the destination server (e.g., server 410) (step 640). The server responds with an ARP response (step 650). Next, the far-side switch inserts the DGT (or SGT, from the perspective of server 410) corresponding to the server's security group (e.g., SGI such as the server's destination group tag (DGT), or SGT, from the perspective of server 410), into the ARP response (step 660). The far-side router receives this ARP response (including the security group information indicating the DSG of server 410) (step 670)), and populates its forwarding information base (FIB) with this information (step 680). As before, the far-side router then performs any other processing required, and routes the packet as appropriate (step 635). It will be noted that, in fact, this routing may include dropping the given packet if the RBACL indicates that the network device is to deny access to the packet.

Figure 7:
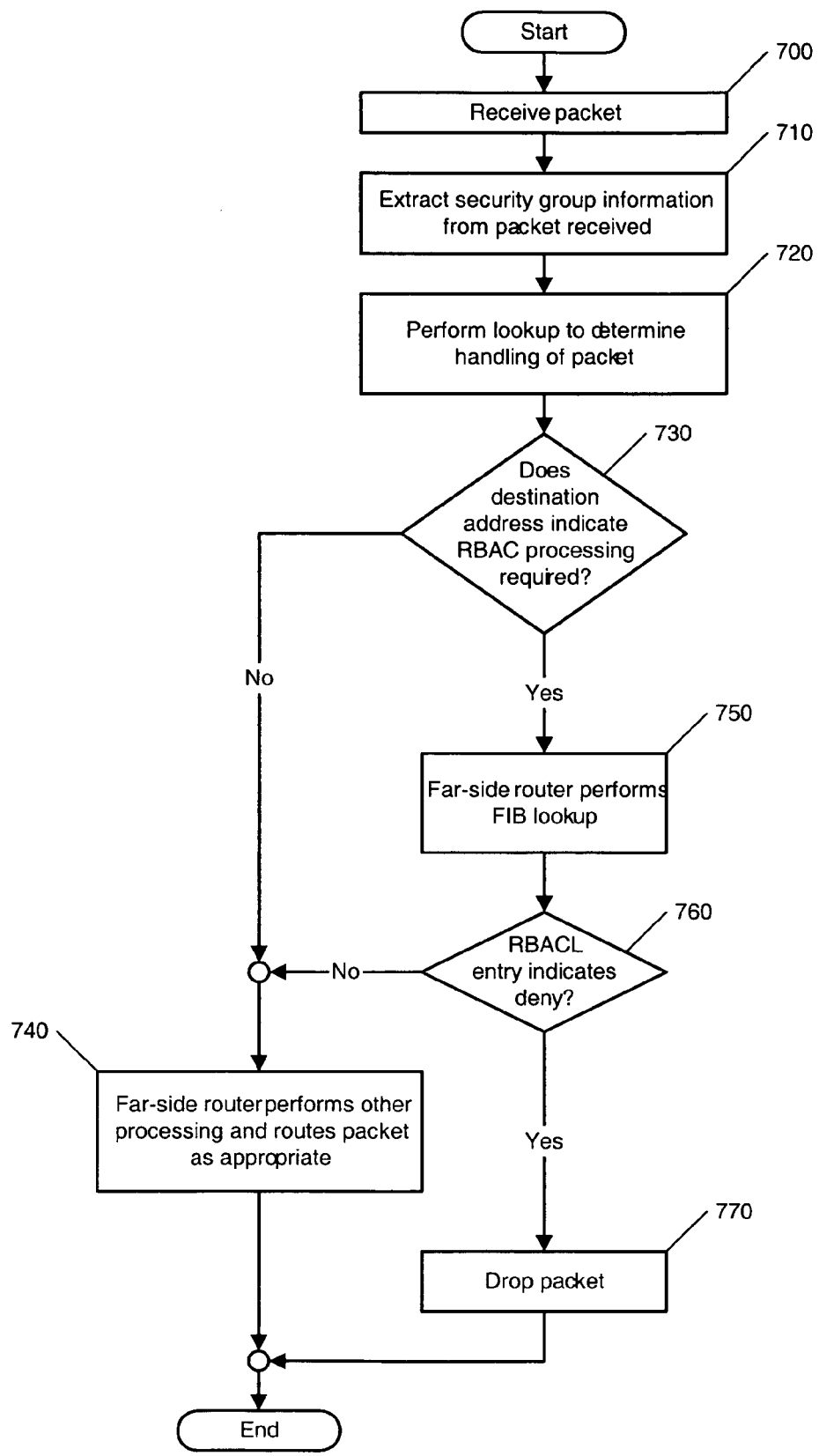
FIG. 7 is a flow diagram illustrating an example of processing performed on a subsequently-received packet subject to role-based access control (RBAC) processing according to embodiments of the present invention.

FIG. 7 is flow diagram illustrating an example of processing performed on a packet received subsequently to that of FIG. 6, while still subject to RBAC processing according to the present invention. The process begins, as before, with receipt of the given packet (step 700). Also as before, the packet's SGT is extracted (step 710). A look-up is performed by the network device (e.g., router 460), in order to determine how the given packet is to be handled (step 720). A determination is then made as to whether the packet's destination address indicates that RBAC processing is required (step 730). If the packet's destination address does not indicate that RBAC processing is required, the far-side network device performs other processing as necessary, and routes the packet appropriately (step 740).

However, if the far-side network device determines that the packet's destination address indicates that RBAC processing is required, the far-side network device performs a forwarding information base (FIB) look-up to determine the DSG (step 750). The far-side network device, during egress ACL processing, then makes a determination as to whether the RBACL entry indicates that the given packet should be denied (step 760). If the RBACL entry indicates that the packet should be denied, the packet is dropped (step 770). Alternatively, if the RBACL entry indicates that the packet should be forwarded, the far-side network device performs other processing as necessary and routes the given packet as appropriate (step 740).

An Example Implementation of Best Effort Propagation of Security Group Information As noted earlier, while the techniques mentioned above provide a number of desirable advantages, such an approach performs access control at the egress node, which mandates that a packet traverse the network before performing access control on the packet. While this approach is conceptually simple, requiring only that the information needed to perform such analysis be aggregated at the egress node, the need to send the packet to the egress node also results in such packets having to be conveyed over the network. This can result in the network carrying traffic unnecessarily, in that such traffic may ultimately be denied at the egress node. As noted earlier, an approach that performs such access control at a point closer to the ingress node is therefore desirable, in order to reduce network traffic. Moreover, such an approach also reduces the susceptibility of a network employing such an approach to denial-of-service (DOS) attacks by applying access controls earlier in a packet's traversal of the network, among other such advantages.

In order to provide these advantages, a method and system of the present invention can be employed to push the security group information needed to perform access control processing into the network as far as possible, from the egress node, towards the ingress node. This "best effort" approach propagates security group information from the egress node, along the route taken by a packet subject to denial at the egress node, in the direction of the ingress node. In one embodiment of the present invention, a best effort technique is used to propagate security group information.

It will be appreciated that the processes described in preceding sections of the present application can be used in the context of the present invention, including assigning security groups, acquiring security group information, taking certain actions with regard to conveying packets across the network, and the like. In particular, as will be noted with regard to the figures described subsequently, the primary differences become evident at the point at which a packet is denied at the egress node, with the present invention's ability to then propagate that information toward the denied packet's ingress node, along the route taken by that packet.

However, certain differences also exist before that point. The present invention can use, for example, an authentication process that is modeled after that employed in the approach described previously, but provides for the propagation of security group information upon successful authentication (e.g., successful authentication of a host or server in a sub-network). Once one or more hosts and servers have been authenticated, packets are passed through the network along their intended routes to their respective egress nodes. For the first packet traversing the network between a given host and server, this portion of the process is similar to that of the process described previously because there is no information relating the destination's security group and address.

Once this first packet reaches its egress node, the packet's receipt triggers a process by which information regarding the destination's security group and address is determined. For example, this information can be obtained from the destination, from network nodes within the sub-network to which the network node is attached, from information stored at the network node or the like. Once this information has been determined, the relationship between the destination's security group and address can be made known to other network nodes along the packet's route. This allows access control processing, which is performed at the egress node using the process described previously, to potentially be performed at a point on the packet's route that is closer to the packet's ingress node. Access control processing can then be performed on subsequent packets sent from the given host to the server in question at that point on the route, rather than waiting until such packets reach the egress node.

As will be appreciated, this approach is particularly advantageous in the situation in which the access control processing results in the denial of packets destined for a given destination, as the sooner a packet is denied, the less unnecessary traffic the network is forced to carry. Moreover, such an approach is able to more quickly prevent the spread of malicious packets. A network employing such an approach is thus able to enjoy the aforementioned benefits of the present invention. Such a process is also typically employed in the situation in which a packet is to be permitted, as a permitted packet will simply be conveyed to the egress node regardless of the point at which access control processing is performed on the packet. Such is typically the case because distinguishing between permits and denies involves unnecessarily complicates the processing of packets, and provides little benefit (given that permitted packets will be conveyed to the egress node in either case). Thus, early access control processing in the case of permitted packets may not offer quite the same advantages as are provided in the case of denied packets. As will also be appreciated, however, the implementations presented herein are but examples of the present invention, and other embodiments will be apparent to one of skill in the art, in light of the disclosure provided herein. Such alternatives are intended to come within the scope of the claims appended hereto.

In one embodiment, the preceding objectives are met through the use of the security groups presented earlier herein. Security group information is made available through the authentication process (e.g., a security group identifier), which can be from an authentication server, for example. Upon authentication (e.g., of a host or server in a sub-network), this security group information is made available to a network node that couples the sub-network to a core network. In the manner previously described, upon receipt of a first packet from a given source to a given destination (e.g., from a host to a server) at the packet's egress node, this security group information is passed from the egress node to one or more of the network nodes along the route taken by the packet. Propagating this information toward the packet's ingress node provides the network nodes along this route with the information needed to perform access control processing on such packets.

However, in the case in which more than one destination can be reached over a given route, such a determination may not be able to be made. In such a case, access control processing is deferred to a subsequent node along the route, at a point at which the destination's security group can be determined definitively. Depending on the situation, this point may actually be the egress node, although in the typical case, access control processing is performed at a node along the route that is closer to the ingress node. In the case in which such a determination cannot be made, a reserved value (e.g., a hexadecimal value of FF) can be used to indicate that access control processing cannot be performed because such a definitive determination cannot be made, for example.

Thus, once the requisite information is passed back along the route, each node along the route should have either the information needed to perform access control processing, or information that indicates such processing is not currently possible at that node, for the given route. It will be noted that the architectures presented herein, such as the foregoing, are described in terms of sub-networks and core networks. As will be appreciated, the present invention can be practiced in any number of network architectures, using any of a number of protocols. The foregoing processes are exemplified by the processes now described in connection with FIGS. 8, 9, 10, 11, 12, 13, 14, 15, 16, 17, 18 and 19 below.

Figure 8:
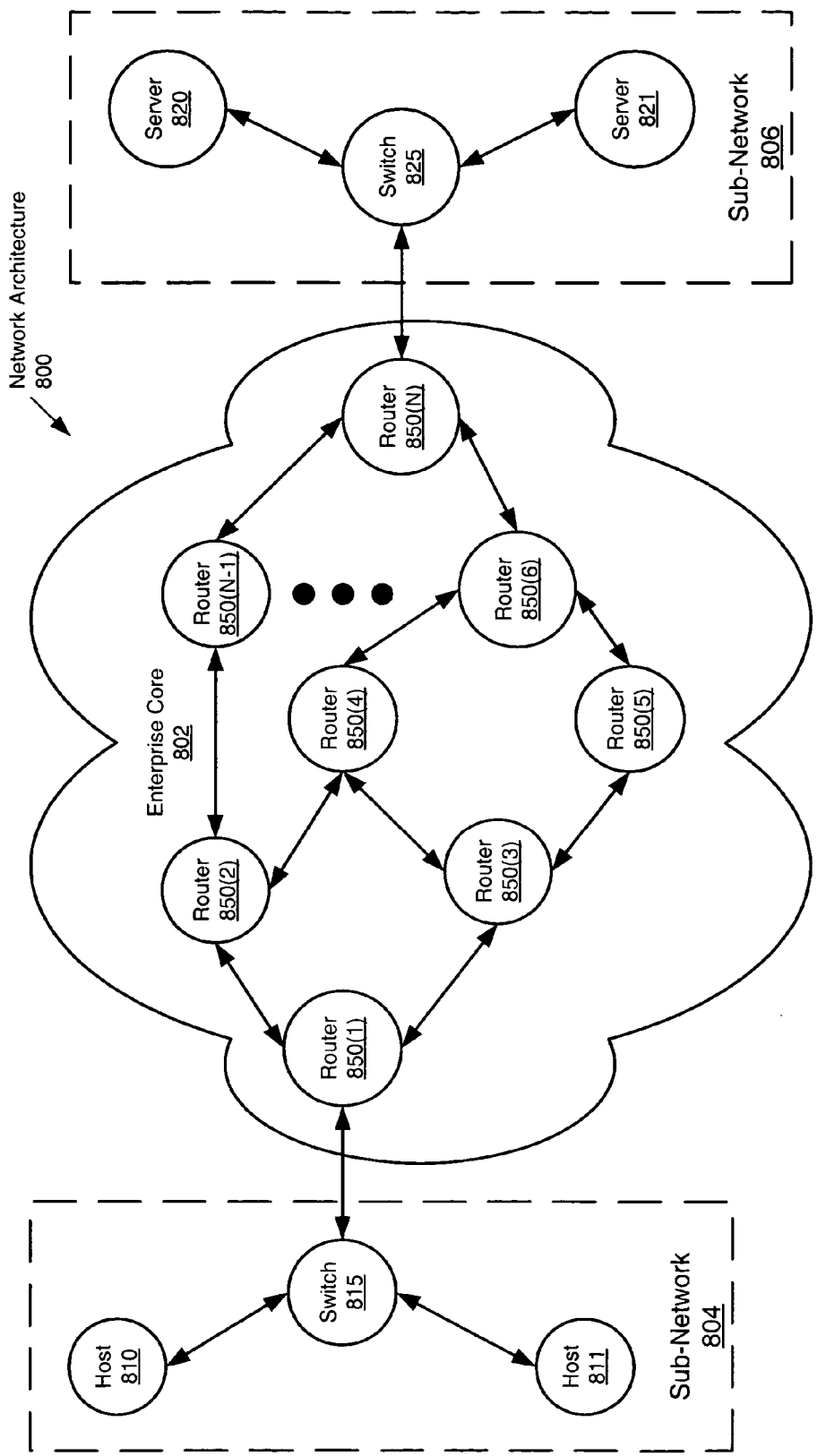
FIG. 8 is a diagram illustrating an example of a network architecture, including hosts and servers, in which the present invention can be practiced.

FIG. 8 is a block diagram illustrating an example of a network architecture 800 in which the present invention can be practiced. As can be seen, network architecture 800 includes an enterprise core network 802, which couples to sub-networks 804 and 806 to one another. Sub-network 804 includes hosts 810 and 811, which are coupled to enterprise core network 802 via a switch 815. Similarly, sub-network 806 includes servers 820 and 821, which are coupled to enterprise core network 802 via a switch 825. Hosts 810 and 811 thus communicate with servers 820 and 821 via enterprise core network 802. Enterprise core network 802 includes a number of network devices, but for the sake of simplicity, is shown as including a number of routers (depicted in FIG. 8 as routers 850(1)-(N)), variously interconnected to one another. As will be appreciated, although enterprise core network 802 is depicted as including only routers 850(1)-(N), enterprise core network 802 can include a variety of other kinds of network devices, depending on the network protocols and architectures supported thereby.

In the context of network architecture 800, as a packet is sourced (e.g., from host 810, via switch 815, to router 850(1)) and traverses enterprise core 802, security group information (e.g., a source group tag) is carried along with the other information in the packet. At the egress edge of enterprise core 802 (e.g., router 850(N)), the destination group of the packet's destination (e.g., server 821) is determined. For example, the destination group can be derived from the forwarding information base (FIB) of router 850(N) via the fully resolved host prefix. The host prefix is resolved through the address resolution protocol (ARP). The ARP response is tagged with the destination's security group information when the response is sourced onto the network. The FIB result is populated with the destination group in addition to the rewrite information. Once the source and destination groups have been determined, the permissions (the relevant ACL entry) can be determined by the egress node (e.g., router 850(N)).

However, as noted, making this determination closer to the ingress node (and preferably, as close as possible to the ingress node) is desirable for a number of reasons. To propagate the security group information into the network, the present invention provides mechanisms to propagate group membership information along a packet's route, from the packet's egress node, toward the packet's ingress node. For example, L3 routing protocols (of the OSI protocols) can be modified to allow for the propagation of security group information (e.g., a security group identifier (SGI) such as a security group tag (SGT)), along with route update information, as part of the operation of the L3 protocol.

Such a process can operate as follows, for example. Within a sub-network at the edge of the L3 network (e.g., an OSI layer-2 (L2) sub-network, such as sub-networks 804 and 806), switches according to the present invention can employ a protocol to propagate security group information to an edge router (e.g., a protocol based on the internet group management protocol (IGMP)). Such a protocol is referred to herein as an internet security group management protocol (ISMP), although other alternatives will be apparent to one of skill in the art in light of the present disclosure. Once a host (e.g., one of hosts 810 and 811) authenticates to its ingress router (e.g., router 850(1)) and is assigned an SGI, the switch in question (here, switch 815) issues an ISMP JOIN request on its uplink ports (non-user ports). One difference between ISMP and IGMP is that only one JOIN request is issued on a given port. If a switch receives multiple JOINs for different SGIs, the switch propagates a JOIN only for a reserved SGI value (e.g., hexadecimal FF) on its uplinks. At the point when the switch is proxy for JOINs of only a single SGI value, the switch issues JOINs for the SGI rather than the reserved SGI value.

At the ingress edge router (e.g., router 850(1)), the sub-network (e.g., sub-network 815) is assigned an SGI. The SGI thus assigned is derived from the ISMP JOINs received, local authentications, and static configurations. If the SGIs identified by these methods are the same, the sub-network is assigned that SGI value. If more than one SGI has been allocated on the sub-network, the sub-network is assigned the reserved SGI value, indicating that the sub-network includes multiple security groups.

The routers within the enterprise core distribute the SGIs along with the sub-network route information. This can be accomplished in a number of ways. For example, the routing information protocol (RIP) can be employed. The open shortest path first (OSPF) protocol can also be employed. It will be apparent to one of skill in the art that the foregoing protocols are merely examples, and that other protocols can be employed to pass security group information (including existing protocols, later-developed protocols, and those developed specifically to propagate such information).

In using RIP (e.g., RIP v2), this security group information is propagated in the route tag field of the route update. Of course, the route tag field should be propagated by the RIP v2 implementation in question. Within OSPF, the OSPF opaque link state advertisement (LSA) option is used to propagate the SGI. This entails a new LSA type be reserved for SGI propagation. Other routing protocols can be modified (or features employed) in a similar manner. When the core's routers aggregate sub-networks, each aggregated sub-network is advertised with the reserved SGI if any of the SGIs in the aggregated sub-network differ from one another. Sub-networks that do not support such functionality are advertised with a NULL SGI (another reserved value). Static SGI assignment for a given sub-network can also be propagated via the routing protocol employed.

Thus, in propagating security group information (e.g., an SGI) from the egress node along the route, toward the ingress node, a decision is made at each node as to whether the destination's security group can be definitively determined. For example, if a given route from host 810 can ultimately lead to destinations having different security group memberships, nodes common to each route will maintain a reserved security group identifier for each destination (e.g., xFF). Thus, for a first destination, the route might be through routers 850(1), 850(2), 850(N-1) and 850(N), and for a second destination, the route might be route through routers 850(1), 850(2), 850(4) and 850(6), the respective destinations' disparate security group identifiers would result in routers 850

(1) and 850(2) maintaining a security group identifier of "FF" for the route that leads to the two destinations. For routers 850(N-1) and 850(N), the security group identifier for the first destination would be maintained, allowing router 850(N-1) to perform access control processing on packets destined for the first destination. Similarly, for routers 850(4) and 850(6), the security group identifier for the first destination would be maintained, allowing router 850(4) to perform access control processing on packets destined for the second destination.

Moreover, this ability is affected by such information maintained at the core network device. For example, if the given sub-network is homogeneous (e.g., if hosts 810 and 811 are members of the same security group, sub-network 804 is homogeneous; or, if hosts 820 and 821 are members of the same security group, sub-network 806 is homogeneous) or heterogeneous (e.g., if hosts 810 and 811 are not members of the same security group, sub-network 804 is heterogeneous; or if hosts 820 and 821 are not members of the same security group, sub-network 806 is heterogeneous), the information maintained at the corresponding core network device (e.g., routers 580(1) and 850 (N), respectively). If the former is the case, the common security group identifier is passed to the corresponding core network device. Alternatively, if the latter is the case, a reserved security group identifier is passed to the corresponding core network device, indicating that the sub-network is heterogeneous.

As a packet traverses the network, a FIB lookup is performed for the destination address (e.g., a destination internet protocol (IP) address). If the SGI present in the FIB is the NULL SGI, the packet is dropped. If the SGI present in the FIB is the reserved SGI, this implies that the requisite binding between destination address and security group is only known deeper in the network. In this case, the packet is permitted. This is the best effort aspect of the security group propagation scheme. At some point, the SGI is determined from the FIB lookup and the access control list (ACL) can be determined. In the worst case, this point is the egress network edge (i.e., the egress node). In the best case, this point is the ingress network edge (i.e., the ingress node). In most enterprise networks, the packet is typically subject to access control somewhere in between the ingress and egress network edges.

Figure 9:
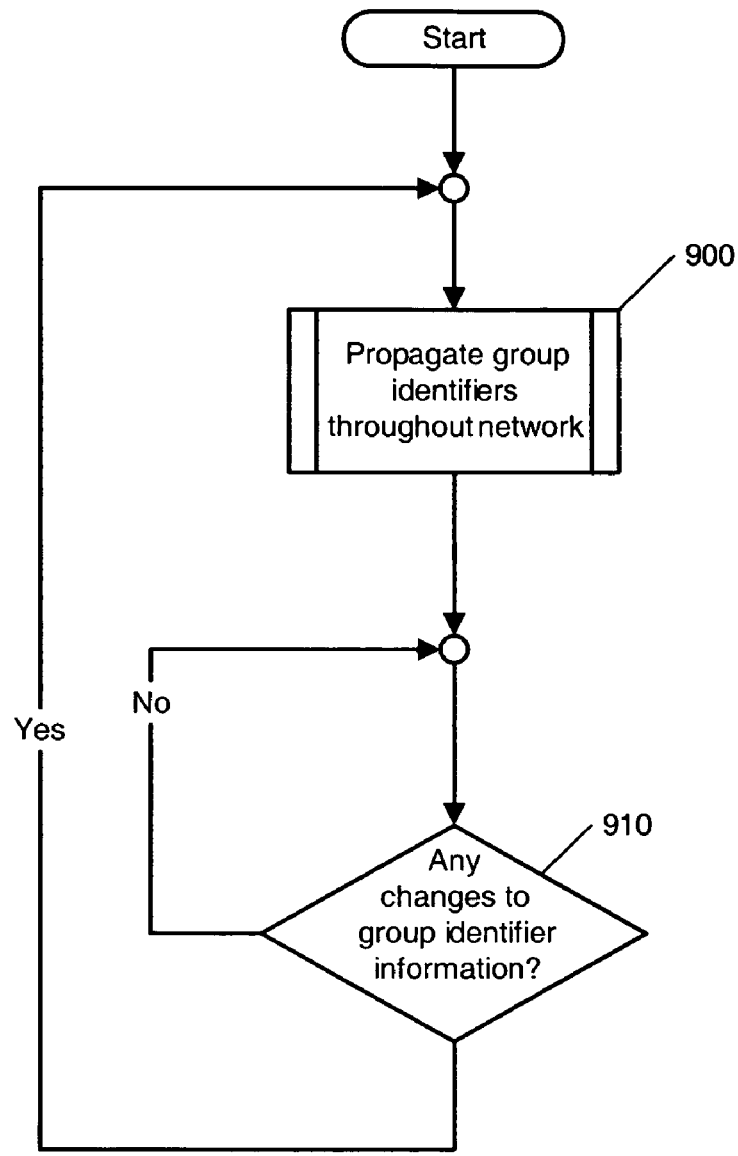
FIG. 9 is a flow diagram illustrating an example of a general process of configuring a network according to embodiments of the present invention.

FIG. 9 is a flow diagram illustrating an example of the general process of configuring a network according to embodiments of the present invention. The process begins with the propagation of security group information (e.g., security group identifiers) along their respective routes through the given network (step 900). The process of propagating group identifiers throughout the network is described in further detail in connection with FIG. 10-19, below. A determination is then made as to whether any changes to the group identifier information have occurred (step 910). These determinations can be effected in any number of ways. For example, security group information can change as a result of an entity (e.g., a host or server) entering or exiting a given portion of the network (e.g., a sub-network). Alternatively, security group information can be aged. In such a scenario, each binding between destination address and security group identifier has a certain life span, after which the binding is considered out-of-date and is deleted. Other such alternatives will be apparent to one of skill in the art in light of the present disclosure.

In the scenario in which the entry and exit of entities into and out of the network are detected, an approach that captures these actions as a feature of the architecture employed is preferable. One approach that captures such events is the authentication process. When an entity (e.g., a host or server) enters the network, the entity is authenticated to ensure that the entity is authorized to access the network, and is indeed the entity thus identified. Conversely, authentication schemes typically include some mechanism for determining that an entity is no longer accessing the network (e.g., aging, in which a lack of activity for a given period of time results in the entity being logged out).

As will also be appreciated, the initialization of the nodes within a network implementing the present invention can be implemented in a number of ways. For example, one approach is to simply maintain only those routes which have been used (e.g., only those routes that have had traffic sent over them will have entries maintained in the tables of each affected node). In this case, if no entry exists, it can be concluded that no security group information exists for the given route. Alternatively, a default security group identifier can be used. An entry can be set to some default value, indicating that no security group identifiers have yet been processed at the given node. For example, such a default value can be a predetermined value that is not otherwise used as a "live" security group identifier; alternatively, the reserved security group identifier can be used, indicating that the route's destination cannot be determined (in this case, due to the fact that no packets destined for that destination have been processed for this route).

Figure 10:
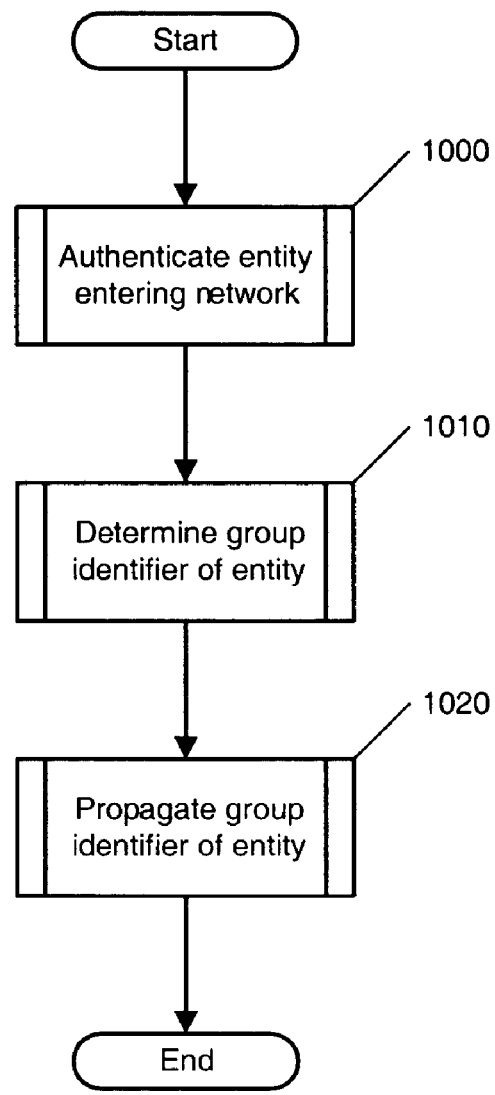
FIG. 10 is a block diagram illustrating a context according to embodiments of the present invention.

FIG. 10 is a flow diagram illustrating a generic example of the authentication of an entity according to embodiments of the present invention. Such a process may be carried out, for example, in a network such as that depicted in any one of FIG. 4, 8 or 11, or in other network architectures. The process begins with the authentication of an entity (step 1000). For example, the process of authentication can be performed upon the entrance (or exit) of the entity into (out of) a sub-network, as will often be the case. The process of authenticating an entity entering the network is discussed in connection with FIGS. 12 and 13. It will be appreciated that the process of authentication also comprehends the exiting of the entity from the network (e.g., by the entity's logging out, aging or the like). It will also be appreciated that although the present invention is discussed in terms of employing the authentication process in the promulgation of security group information, security group information can in fact be promulgated using a different mechanism, as noted earlier herein.

The security group identifier is also determined at this time (step 1010). Typically, the determination of the entity's security group information will also involve presenting that information to the edge network device to which the sub-network is coupled, though this need not necessarily be the case. As will be appreciated, the processed used in authenticating an entity entering a network of the present invention are largely unchanged from the authentication processes traditionally employed. However, in an authentication process of the present invention, an authentication server or the like can be used to maintain security group information, and provide the requisite security group information to the entity, network devices within the sub-network, edge network devices, or the like. Such actions will be discussed in connection with FIGS. 12, 13 and 14, below. Once the entity's security group identifier has been determined, this security group identifier can be propagated to the ingress node to which the sub-network is coupled (step 1020). As will be appreciated, in light of the present disclosure, such a process can be employed with equal success at any level of the given network.

Figure 11:
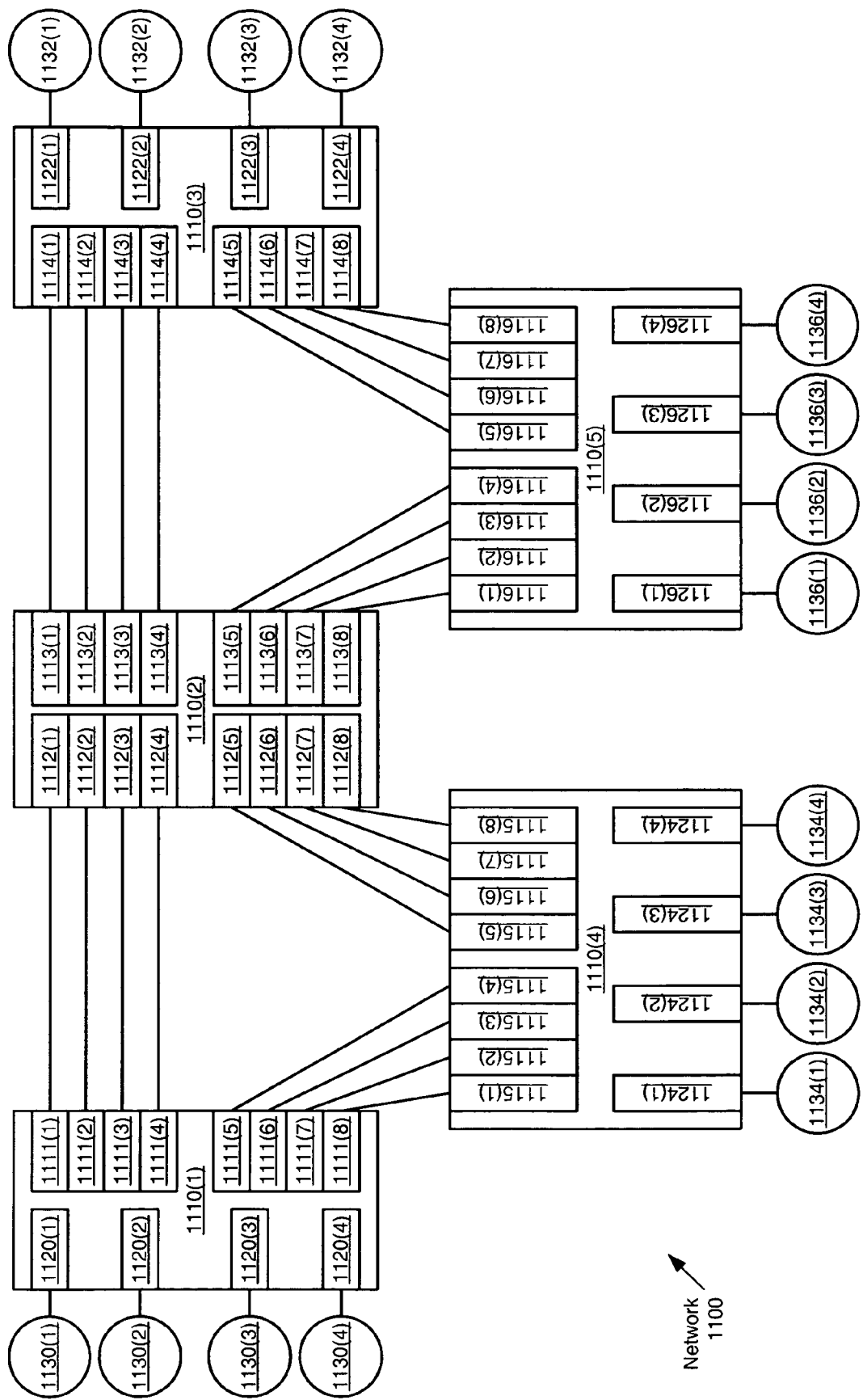
FIG. 11 is a block diagram illustrating a network according to embodiments of the present invention.

FIG. 11 is a block diagram illustrating a network architecture 1100, in which the present invention can be practiced. Network architecture 1100 depicts a network smaller than that depicted in FIG. 8, yet in greater detail. Network architecture 1100 includes a number of network devices (depicted as core network devices 1110(1)-(5)). As will be understood by one of skill in the art, core network devices 1110(1)-(5) are merely examples of network devices that can be used to fashion network 1100. Certain ones of core network devices 1110(1)-(5) are also referred to herein as edge network devices (e.g., core network devices 1110(1), 1110(2), 1110(4) and 1110(5)). As will be appreciated, one example of such network devices is a router, as is used elsewhere herein.

Each of core network devices 1110(1)-(5) includes a number of ports (depicted in FIG. 11 as core ports 1111(1)-(8), 1112(1)-(8), 1113(1)-(8), 1114(1)-(8), 1115(1)-(8) and 1116(1)-(8)). Core network devices 1110(1)-(5) are coupled to one another via these core ports. Each of core network devices 1110(1), 1110(2), 1110(4) and 1110(5) also a number of edge ports (depicted in FIG. 11 as edge ports 1120(1)-(4), 1122(1)-(4), 1124(1)-(4) and 1126(1)-(4)). While each of core network devices 1110(1), 1110(3), 1110(4) and 1110(5) are each shown as including eight core ports and 4 edge ports, and core network device 1110(2) is shown as including 16 core ports, it will be appreciated that these network devices can have a larger or smaller number of core ports and/or edge ports. It will also be appreciated that the connection between the core ports depicted in FIG. 11 are merely one example of the many possible arrangements that such couplings might take. Coupled to the edge ports depicted in FIG. 11 are a number of sub-network network devices (depicted in FIG. 11 as sub-network network devices 1130(1)-(4), 1132(1)-(4), 1134(1)-(4) and 1136(1)-(4)). Each of the edge ports thus allows a sub-network access to the network. As will be appreciated in light of the present disclosure, each of the sub-network network devices depicted in FIG. 11 can be used by an entity in a respective sub-network to access other entities coupled to network 1100. For example, a host (not shown) within a sub-network including sub-network network device 1130(1) is able to access a server (not shown) coupled to core network device 1110(5) by sub-network network device 1136(4).

As noted earlier, the best-efforts aspect of the present invention lies in the ability of such a network architecture to push the security group information for a given destination, upstream (i.e., toward the ingress node) along the given route. Thus, for example, a packet might traverse a route between sub-network network device 1130(1), and sub-network network devices 1136(1) and 1136(2). If the destinations coupled to sub-network network devices 1136(1) and 1136(2) are of different security groups, the core network devices along this route (core network devices 1110(1) and 1110(2)) will not be able to distinguish between the destinations until the packet reaches core network device 1110(5), at which point access control can finally be performed. However, if the destinations are of the same security group, the security group information for the destinations can be propagated upstream, from the edge network device (core network device 1110(5)) to the other core network devices (to core network device 1110(2), and then to core network device 1110(1)). In the case of a packet being denied, it will be appreciated that this ability to perform access control processing at core network device 1110(1) leads to reduced network traffic, better use of network resources, and so on, in comparison to performing access control at the egress node, as noted earlier.

Often, the entities within a given sub-network are homogeneous (i.e., are all members of the same security group). If such homogeneity is mandated, the edge network devices of a network of the present invention need not be concerned with handling the case of a heterogeneous sub-network. However, this need not be the case. If the entities within a given sub-network are instead allowed to be heterogeneous (i.e., of different security groups), however, a mechanism is needed to handle the case in which a route to the corresponding egress node is used to reach destinations within the given sub-network having different security group memberships. One approach in such a situation is to provide a mechanism that allows information regarding security group membership to be aggregated and made available to the egress node.

In one embodiment, as entities are authenticated, their security group information is received by and maintained on the given server (or host or the like). It will be appreciated that such information can also be maintained on a corresponding sub-network network device, on a dedicated network device or at some other location. When this information is needed by the corresponding edge network device, the server provides the information to the edge network device. The edge network device then associates this information with the route through the given edge port. As security group information accrues for the routes through this edge port, the security group for each such destination is associated with that route (and so, edge port). If the security group membership for each destination of a given route remains homogeneous, the security group information for the port reflects this information. However, if a destination having a different security group membership becomes a destination of the given route, the security group membership becomes heterogeneous. In this case, the route at the edge router is given a reserved value, and access control processing is performed in the usual manner. One such approach is the use of a generic attribute registration protocol (GARP) information propagation context.

Figure 12:
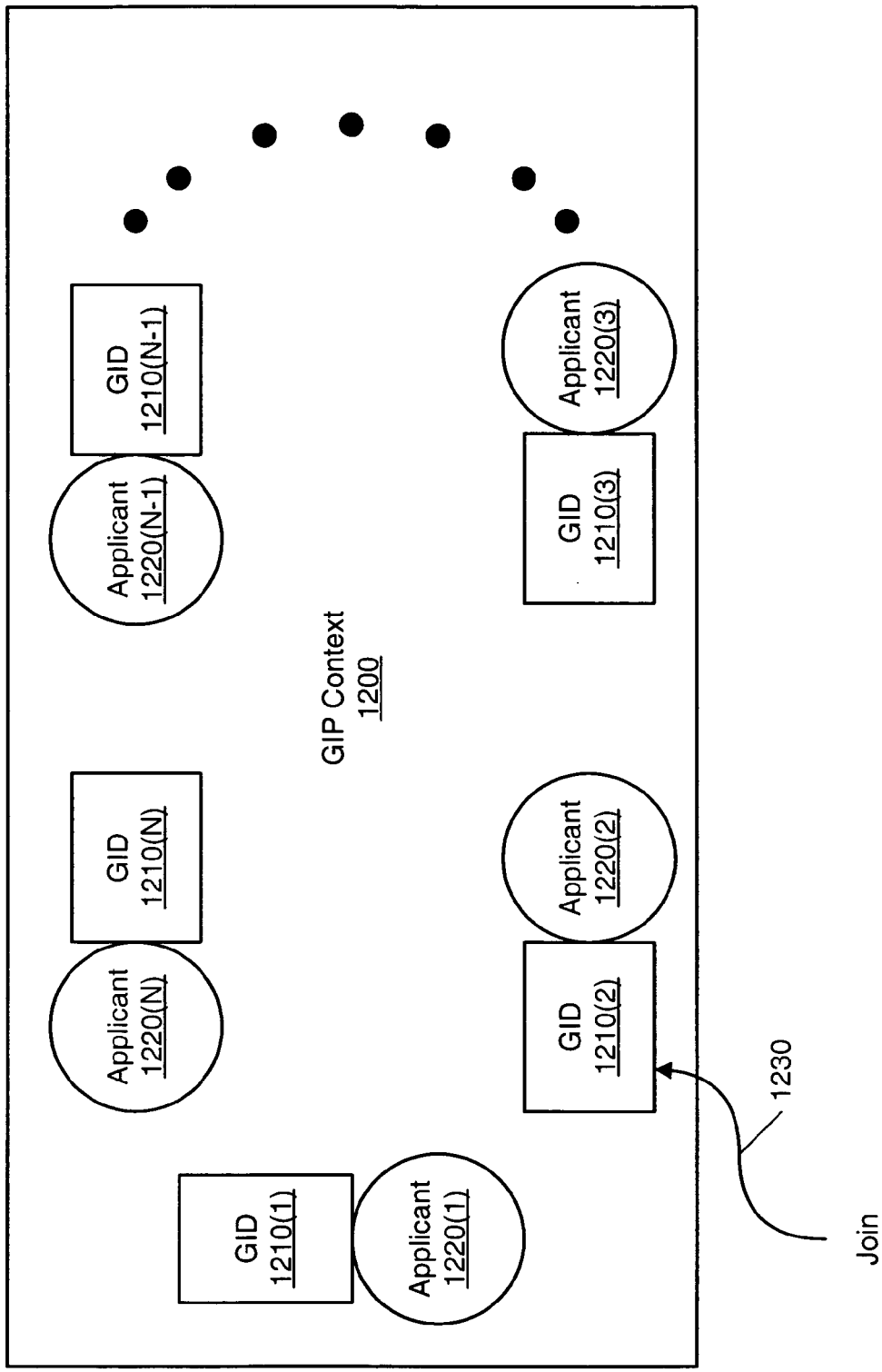
FIG. 12 is a flow diagram illustrating an example of the operation of a host-side sub-network according to embodiments of the present invention.

FIG. 12 is a block diagram illustrating a GARP information propagation (GIP) context 1200. Within GIP context 1200, there are included a number of GARP information declarations (depicted as GARP information declarations (GIDs) 1210(1)-(N)), and respectively associated therewith, a number of applicants (depicted as applicants 1220(1)-(N)). GID 1210(2) is subject to a JOIN operation (depicted as a join request 1230). According to one embodiment of the present invention, a GIP context such as GIP context 1200 is used to propagate security group information such as a security group identifier. In the setting of FIG. 12, a JOIN (e.g., join request 1230) is sent to publish the security group information of the host/server joining GIP context 1200.

Thus, for each port of a given sub-network network device, there is an attribute type that represents the security group identifier of the host coupled thereto. The security group identifier of a given port is that of the security group identifier received by the GID registrar (not shown). In a IEEE standards-based network, packets containing security group information can be authenticated via IEEE 802.10 encapsulation, for example. As noted, in such a scenario, bridges can be configured to act in a manner similar to that of an IEEE 802.10 multicast group. This scenario is discussed subsequently in connection with FIG. 19. It will also be appreciated that, if security trunk ports are also VLAN (i.e., IEEE 802.1Q-1998) trunk ports, the security group identifier is assigned on a per {port, VLAN} basis.

As noted earlier, such a mechanism should also contemplate the exit of such entities from the network (typically, via logging out, being disconnected or the like). In that a similar vein, the opposite process (executing a GIP "LEAVE") can be performed when an entity leaves a given sub-network. This change will then be propagated to the appropriate network device(s) (e.g., the L2 device (e.g., switch) to which the host is coupled, the edge network device or the like).

The process described above can be simplified by having the host/server join GIP context 1200 only if the security group information of the host/server joining differs from that already recorded by the applicant's associated registrar. However, in such a scenario, a mechanism should be provided to take into account the situation in which an entity exits a heterogeneous GIP context, and is the last entity of the given security group. In so doing, such an event can leave the GIP context with either one less security group, or make the GIP context homogeneous (i.e., leave the sub-network in a homogenous state, with entities of only one security group therein). An example of an implementation of a protocol that employs the structures and methods described in connection with FIGS. 11 and 12 can be found in patent application Ser. No. 10/696,629, filed Oct. 29, 2003, and entitled "METHOD AND APPARATUS FOR PROVIDING NETWORK SECURITY USING SECURITY LABELING," having Michael R. Smith as inventor, which is hereby incorporated by reference herein, in its entirety and for all purposes.

Figure 13:
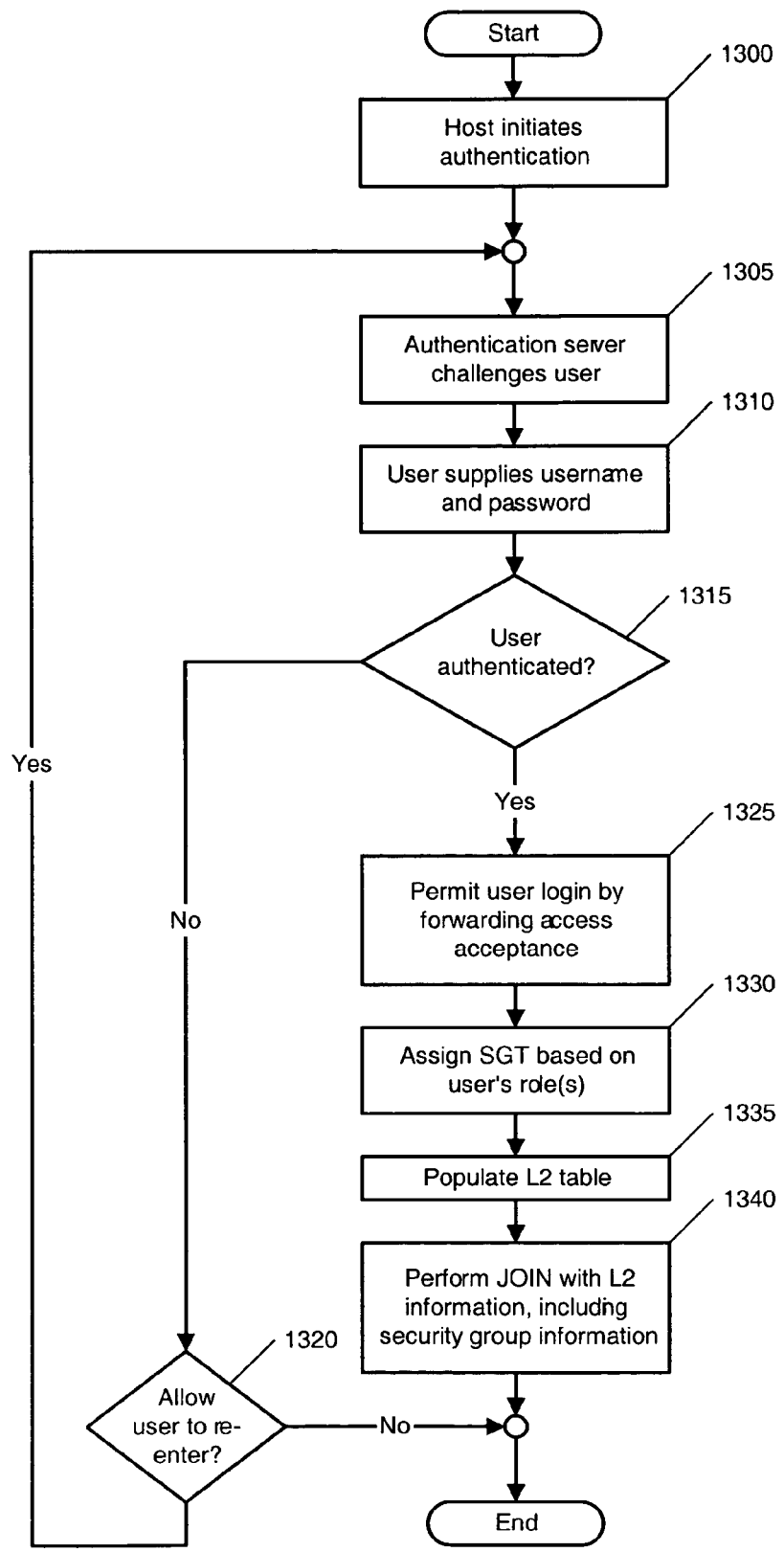
FIG. 13 is a flow diagram illustrating an example of the operation of a server-side sub-network according to embodiments of the present invention.

FIG. 13 is a flow diagram illustrating an example of the operation of a host-side sub-network that employs a GIP context such as that described above, to effect propagation of security group information. The process begins with the host initiating the authentication process (step 1300). Next, a challenge is issued from an authentication server, to challenge the user for their user name and password (step 1305). In response to this challenge, the user supplies their username and password (step 1310). A determination is then made as to whether the authentication server can authenticate the user (step 1315). If the user cannot be authenticated, a determination is made as to whether not to allow the user to re-enter their username and password (step 1320). If the re-entry of this information is acceptable, process proceeds with the authentication server challenging the user (step 1305). Otherwise (e.g., if either this re-entry has been allowed a maximum a number of times, re-entry is not allowed or the like), the process concludes.

Alternatively, if authenticated (step 1315), the user is permitted to log in, which is accomplished by forwarding access acceptance to the host (step 1325). Additionally, security group information (e.g., an SGI) is assigned to the host, based on the user's role(s) (step 1330). This, along with other information, is used to populate the layer 2 table (i.e., forwarding table, or comparable construct) maintained by the sub-network network device (e.g., a switch) (step 1335). At this time, in the embodiment described in FIG. 13, a JOIN is also issued, in the manner discussed in connection with FIG. 12. This completes the process of user login.

Figure 14:
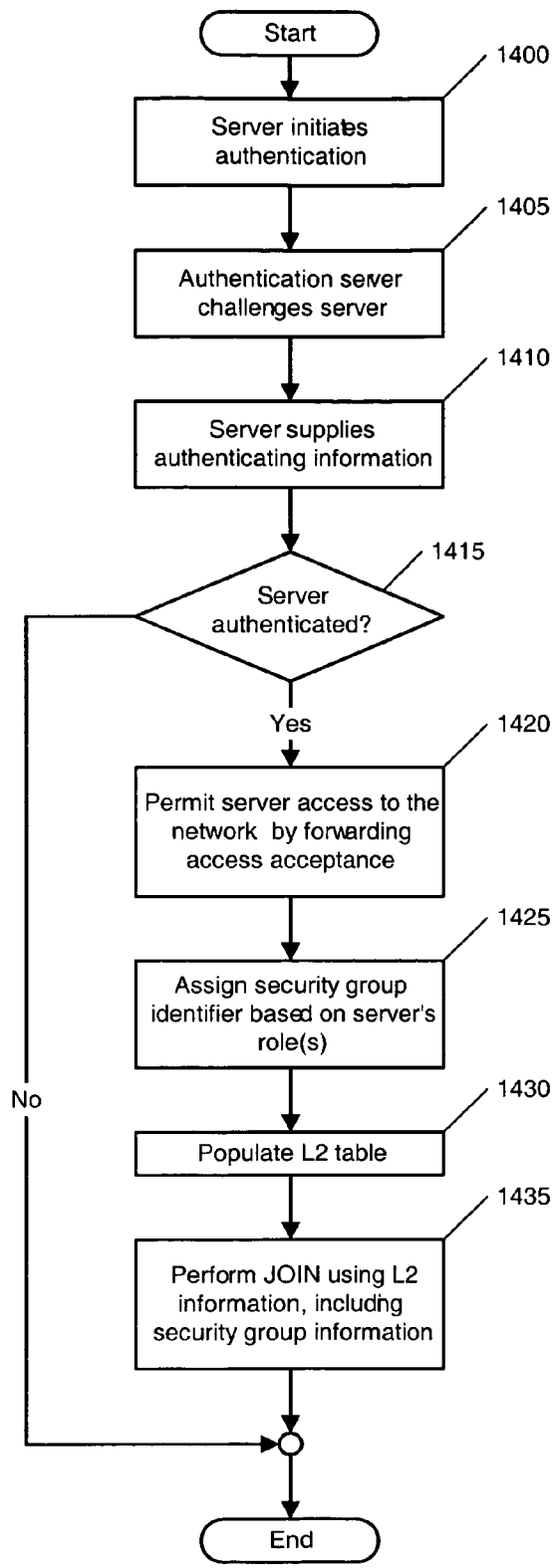
FIG. 14 is a flow diagram illustrating a generic example of the authentication of an entity according to embodiments of the present invention.

FIG. 14 is flow diagram illustrating an example of the operation of a server-side sub-network that employs a GIP context such as that described above, to effect propagation of security group information. The process begins with the initiation of the authentication process by a server (step 1400). Once authentication is initiated, an authentication server challenges the server (e.g., via a switch) (step 1405). In response, the server supplies authenticating information to the authentication server (e.g., via the switch) (step 1410). A determination is then made by the authentication server as to whether the server has been properly authenticated (step 1415). If the server fails this authentication process, the process concludes, and the server is not permitted access to the network.

However, if the server is authenticated (step 1415), the server given permission to access the network as a result of the authentication server forwarding the access acceptance to the switch and the server (step 1420). Additionally, a security group identifier is assigned to the server at the switch, based on the server's role(s) (step 1425). It will be appreciated that, in fact, the question as to whether a security group is a source or destination security group is taken from the view of the direction of the packet in question. This, along with other information is used to populate the layer 2 table of switch 1420 (step 1430). At this point, a JOIN is also issued, using the layer 2 information, as well as the relevant security group information, in the manner discussed in connection with FIG. 12 (step 1435).

As will be appreciated, the processes depicted in FIGS. 13 and 14 can be genericized to include the entry (or exit) of any entity to (from) any network or portion thereof. Thus, although the preceding descriptions were in terms of entry into a given L2 sub-network, such need not be the case. The entry (or exit) of an entity such as a host or server, to (from) a sub-network simply needs to result in the identification of the entity's security group identifier, and the recognition that the entity's security group needs to be made known to the ingress (or egress) network node (e.g., router), to allow for propagation of this security group information.

Figure 15:
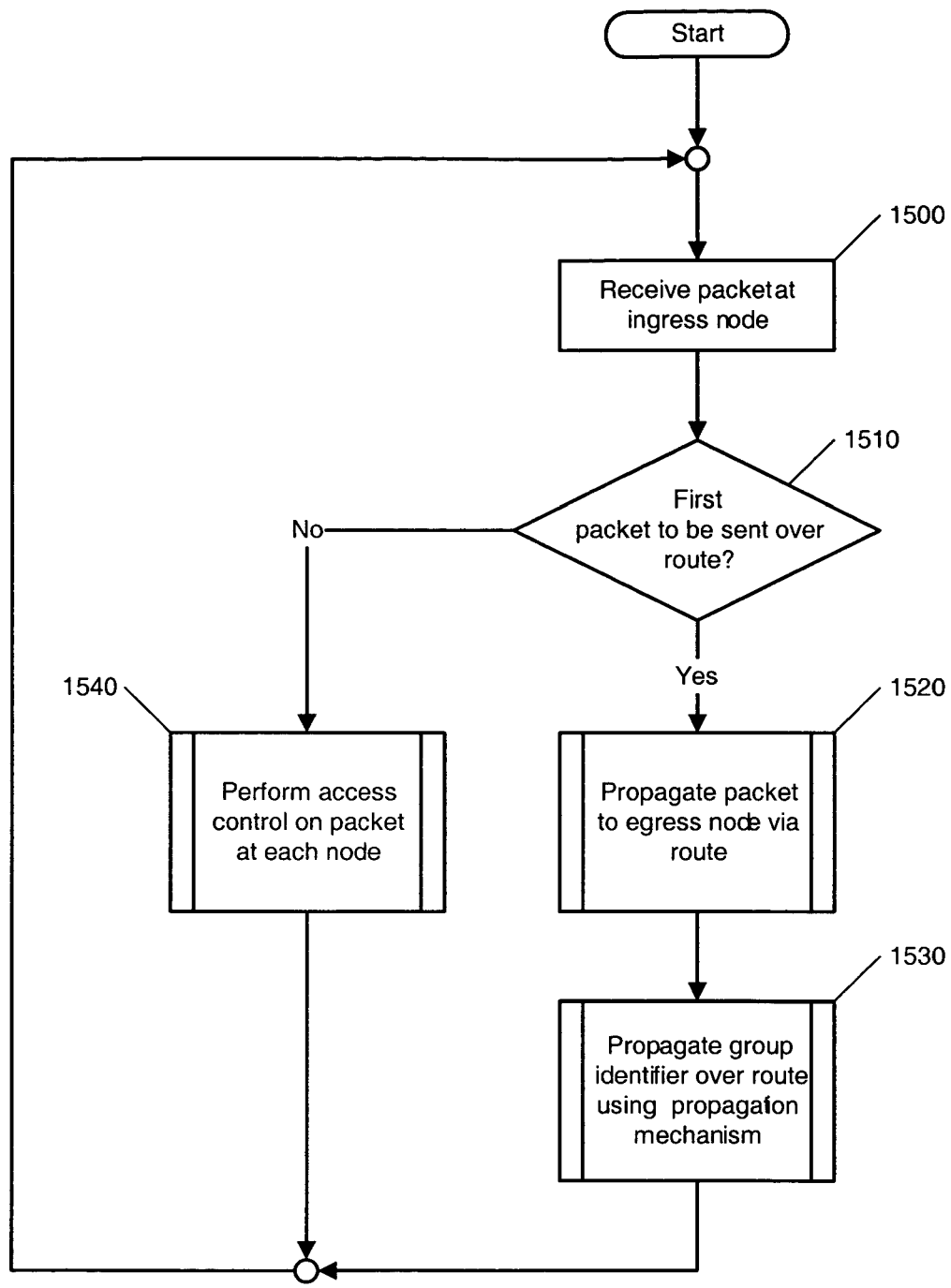
FIG. 15 is a flow diagram illustrating a generic example of packet processing in a core network according to embodiments of the present invention.

FIG. 15 is a flow diagram illustrating a generic example of packet processing in a core network according to embodiments of the present invention. The process begins with receipt of a packet at an ingress node (step 1500). A determination is then made as to whether the given packet is the first packet to be sent over the route in question (step 1510). If the packet is the first to be sent over the given route, core network devices along the route will not possess information as to the destination's security group, and so will be unable to perform any access control processing on the packet. Thus, the packet will be propagated to the intended egress node over the selected route (step 1520). Once the packet is received at the egress node, the egress node is able to obtain information regarding the destination's security group. This security group information can be obtained, for example, in the manner described earlier in connection with FIGS. 5, 6 and 7. Once this information is obtained, the security group information can be passed back toward the ingress node along the selected route. Thus, the destination's security group identifier (as well as the destination's address) is propagated over the selected route using a propagation mechanism such as those described earlier (step 1530).

Alternatively, the packet may not be the first sent over the selected route from the source entity to the destination entity in question, in which case access control processing should be performed as early in the route as is possible. If the packet is not the first to be sent over this route (step 1510), it is assumed that the propagation of an earlier packet over the route resulted in the destination's security group information being propagated back toward the ingress node over the route. Thus, an attempt to perform access control processing on the given packet is made at each node along the route (step 1540). It will be appreciated that, depending on the situation, a given node along the route may be unable to perform such access control processing (e.g., in the case where multiple destination are accessible by the given source entity and those destinations are members of different security groups).

Figure 16:
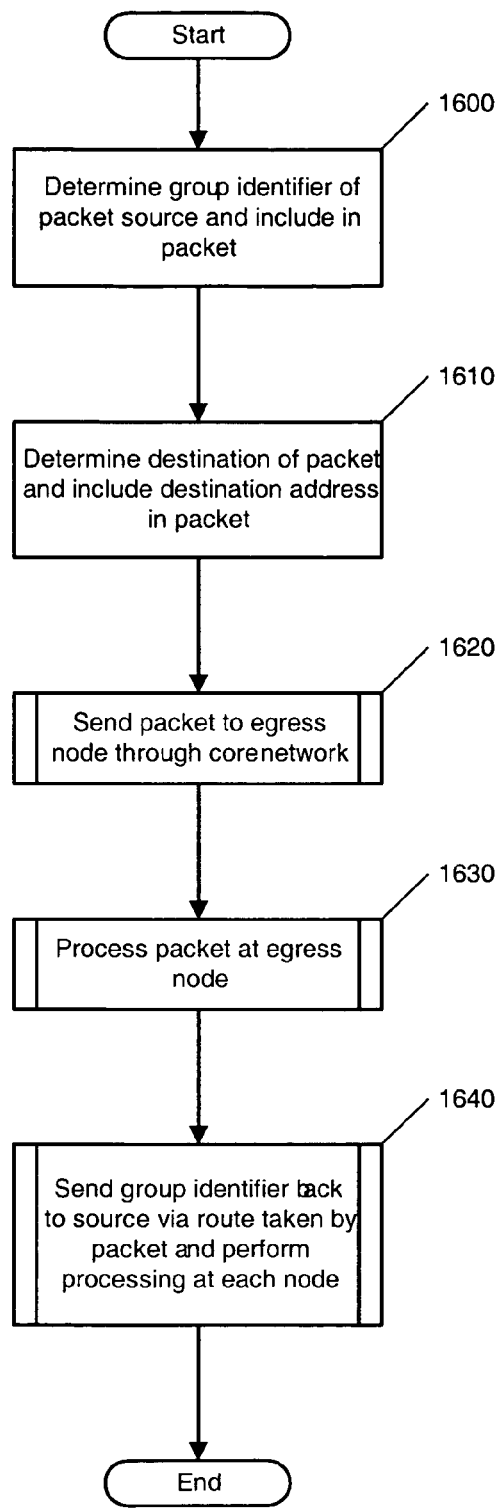
FIG. 16 is a flow diagram illustrating a process for sending a packet through a core network according to embodiments of the present invention.

FIG. 16 is a flow diagram illustrating a process for sending a packet through a core network according to embodiments of the present invention. In doing so, such a process provides for the configuration of core network devices along the given route. The process begins with the determination of a security group identifier of the source entity sending the packet, and the inclusion of the source's security group identifier within the packet (step 1600). Next, the packet's destination is determined, and the destination's address is included in the packet (step 1610). The packet is then sent through the core network along the selected route, to the egress node that is to (at least potentially) provide access to the packet's destination (step 1620).

Assuming that the packet is the first from the source to the destination, once the packet is received at the egress node, the packet is processed according to the present invention (step 1630). As noted earlier, an example of sending the packet through the core network to the egress node and processing the packet at the egress node has been described in connection with FIGS. 5, 6 and 7, which described the process of a packet traversing the network and it's processing at an egress node according to one embodiments of the present invention. As will be appreciated, the determination of the destination's security group information can be performed by querying the destination (e.g., in the manner presented in connection with FIG. 6), by maintaining such information at the edge network device (e.g., using a GIP context such as that discussed in connection with FIGS. 12, 13 and 14).

Once the packet has been processed at the egress node, the destination's security group is known, and that information (as well as other information such as destination's address) can be sent to preceding core network devices along the given route. Thus, the security group identifier of the destination is sent back toward the ingress node via this route and such information is processed at each of these core network devices in a manner according to the present invention (step 1640). This back-propagation of security group information can be performed, for example, using the routing information protocol (RIP) or the open shortest path first (OSPF) protocol.

The routers within the enterprise core distribute the SGIs along with the sub-network route information. This can be accomplished in a number of ways. For example, the routing information protocol (RIP) can be employed. The open shortest path first (OSPF) protocol can also be employed. In using RIP (e.g., RIP v2), the security group information is propagated in the route tag field of the route update. Within OSPF, the OSPF opaque link state advertisement (LSA) option is used to propagate the SGI. This entails a new LSA type be reserved for SGI propagation. Other routing protocols can be modified (or features employed) in a similar manner. As noted, when the core's routers aggregate sub-networks, each aggregated sub-network is advertised with the reserved SGI if any of the SGIs in the aggregated sub-network differ form one another. As also noted, sub-networks that do not support such functionality can be advertised with a NULL SGI (another reserved value) or the like. Static SGI assignment for a given sub-network can also be propagated via the routing protocol employed.

Figure 17:
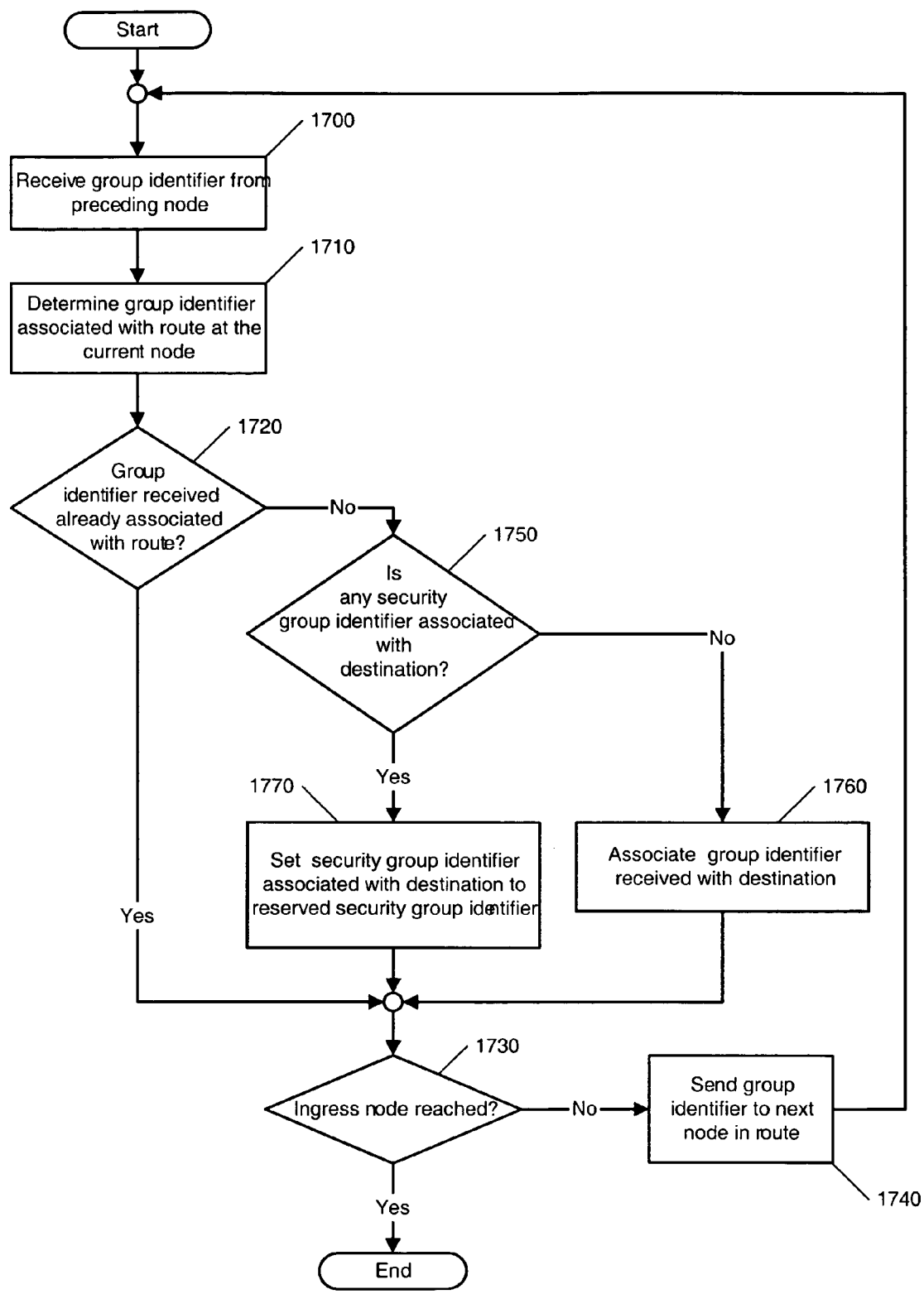
FIG. 17 is a flow diagram illustrating a process for communicating a security group identifier and related information upstream according to embodiments of the present invention.

FIG. 17 is a flow diagram illustrating a process for communicating a security group identifier and related information upstream (towards the ingress node) according to embodiments of the present invention. As will be appreciated, this process of propagating destination information along the given route toward the ingress node is an example of that envisioned for the last action performed in the flow diagram of FIG. 16. The process begins with receipt of a security group identifier for the given destination from a preceding core network device (step 1700). Once the security group identifier has been received from the preceding core network device, a determination is made as to whether the security group identifier received is associated with the route in question at the current node (step 1710). If the security group identifier received is already associated with the given route (step 1720), a determination is made as to whether the node receiving the security group identifier is the ingress node of the given route (step 1730). If the node in question is the ingress node, the process is at an end. However, if the node is question is not the ingress node (i.e., the ingress node has not been reached), the security group identifier is sent to the next upstream core network device on the route (step 1740). The process then repeats.

However, if the security group identifier received has not already been associated with the given route, a determination is made as to whether a security group identifier is associated with the given destination, for the given route (step 1750). If a security group identifier has not been associated with a route's destination, the security group identifier received is associated with the given route's destination (step 1760). Once the security group identifier of the destination is associated with the route's destination at the given node, a determination is made as to whether the given node is the ingress node (i.e., whether the ingress node has been reached) (step 1730). If the ingress node has been reached, the process is at an end. However, if the ingress node has not yet been reached, the security group identifier is sent to the next node in the route towards the ingress node (step 1740), and the process repeats.

If a group identifier is associated with the route's destination, the security group identifier associated with the route's destination is set to the reserves security group identifier, in order to indicate that a determination of a destination's security group for the give route cannot be made at this point in the network (step 1770). As before, a determination as whether the ingress has been reached is then made (step 1730). If the ingress node has been reached, the process concludes. However, if the ingress node has not yet been reached, the security group identifier for the destination is sent to the next node in the route towards the ingress node (step 1740), and the process repeats.

Figure 18:
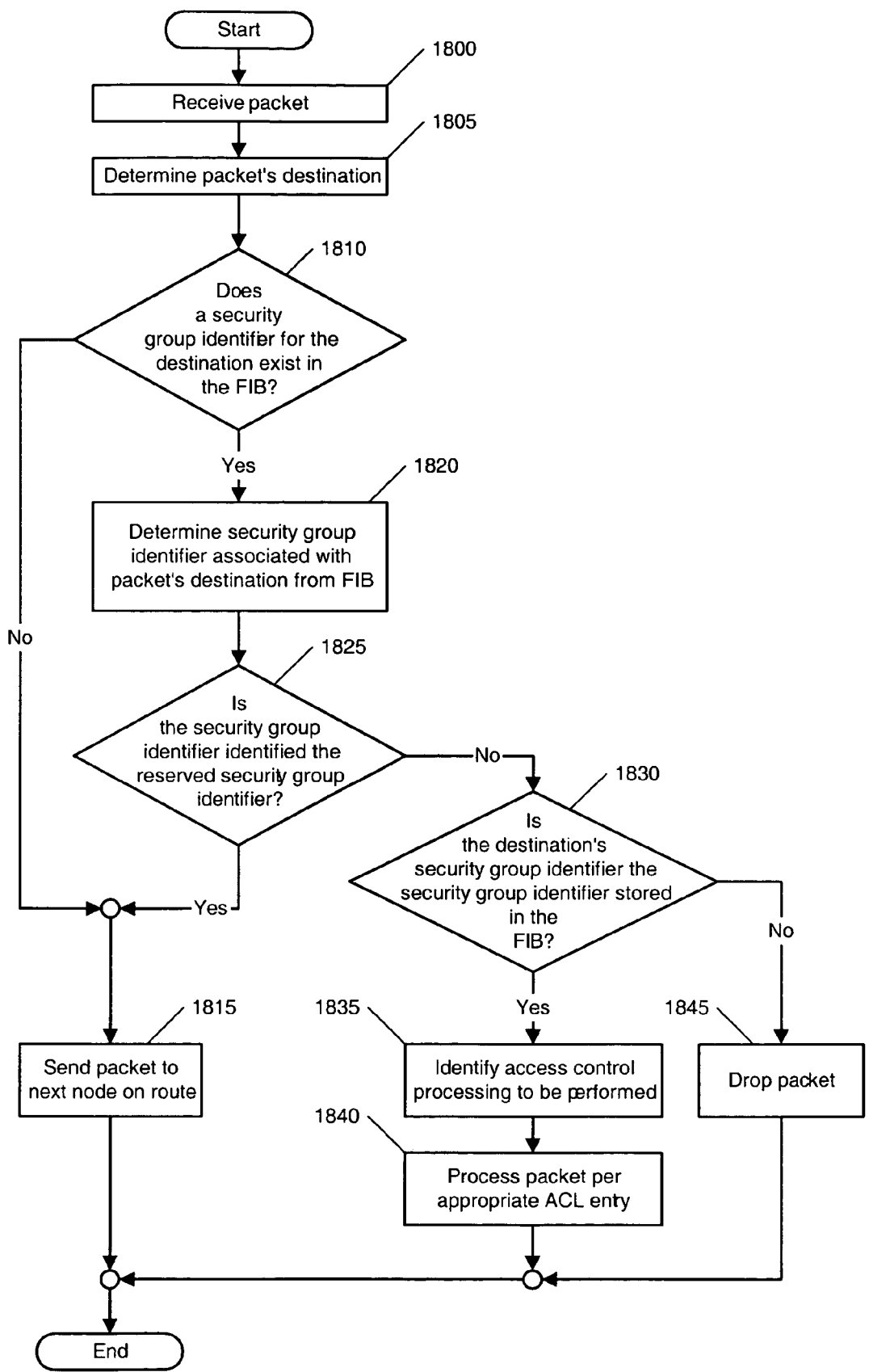
FIG. 18 is a flow diagram illustrating a process for determining packet handling according to embodiments of the present invention.

FIG. 18 is a flow diagram illustrating a process for determining packet handling when sending a packet downstream (toward an egress node), according to embodiments of the present invention. In this process, packets sent from a source entity to a destination entity subsequent to the first packet sent are subject to access control processing, preferably at the earliest point along such packet's route. The process depicted in FIG. 18 is an example of a process performed at a given node (e.g., core network device) along the packet's given route. The process begins with a packet's receipt (step 1800). Once the packet has been received, the packet is analyzed and a determination is made as to the packet's destination (step 1805). A determination is then made as to whether the given destination's security group identifier exists in the node's forwarding information base (FIB) (step 1810). If such an entry does not exist, the packet in question is sent to the next node on the given route (step 1815), and the process concludes for the given node. As will be apparent to one of skill in the art, the process depicted in FIG. 18 will then be performed at that next node. As will also be appreciated, this portion of the process depicted in FIG. 18 represents processing of the first packet sent from the given source to the given destination via this route.

If the destination's security group identifier exists in the FIB, a determination is made as to the destination's security group identifier's association with the packet's destination, using the FIB entry (step 1820). Once the request security group identifier has been identified, a determination is made as to whether the destination's security group identifier is the reserved security group identifier (step 1825). If the security group identifier maintained in the node's FIB is the reserved security group identifier, this indicates that access control processing cannot be performed at the given node, as a result of the inability to identify a single security group for the given route's destination(s). Thus, the packet is sent to the next node on the given route (step 1815), in the hope that access control processing can be performed on that node. As before, the process then concludes.

However, if the destination's security group identifier in the node's FIB is not the reserved security group identifier, a determination is made as to whether the destination's security group identifier is the same as that stored in the FIB. If the destination's security group identifier is that stored in the FIB, the appropriate access control processing to be performed is identified (step 1835). The appropriate access control processing is then performed (e.g., the packet is processed per the appropriate access control list entity) (step 1840). As will be appreciated, given the present invention's use of security groups, the access control processing that is performed is role-based access control processing. The result of this role-based access control processing may be to drop the packet, perform additional processing on the packet and/or send the packet to the next node in the given route. However, if the destination's security group identifier is not within the FIB, the packet is dropped (step 1845). This might be the case, for example, with the packet's destination is within a sub-network that does not support such access control processing. In such a case, entities within such a sub-network can communicate this lack of functionality by propagating a null security group identifier through the network. In either case, the process concludes.

Various modifications and variations are also contemplated by the present disclosure. For example, it will be noted that security group identifiers can be aggregated into "super-groups," in order to allow for the further aggregation of portions of a network, and so earlier access control processing. For example, a network may be amenable to being sub-divided into a number of segments, or the sub-networks coupled to an enterprise network may share security group memberships. This permits a determination to be made for an aggregation of such segments, thereby allowing the determination to be made for a larger portion of the network (than just a single segment). If the segments being aggregated are homogeneous, the aggregation of these segments is a recognition of the security group including more than just one segment.

In a similar respect, the use of super-groups allows for improved efficiency through the aggregation of heterogeneous segments, in the case in which the segments have one or more security group memberships in common. The efficiency provided in this scenario results from the ability to perform access control for the common security group for both segments. Ultimately, if a security group identifier to be added is already within the super-group to which the security group identifier is being added, the addition of the security group identifier does not result in the reserved security group identifier being associated with the given destination. Other alternatives are contemplated by the present invention, as evidenced below in connection with FIG. 19.

Figure 19:
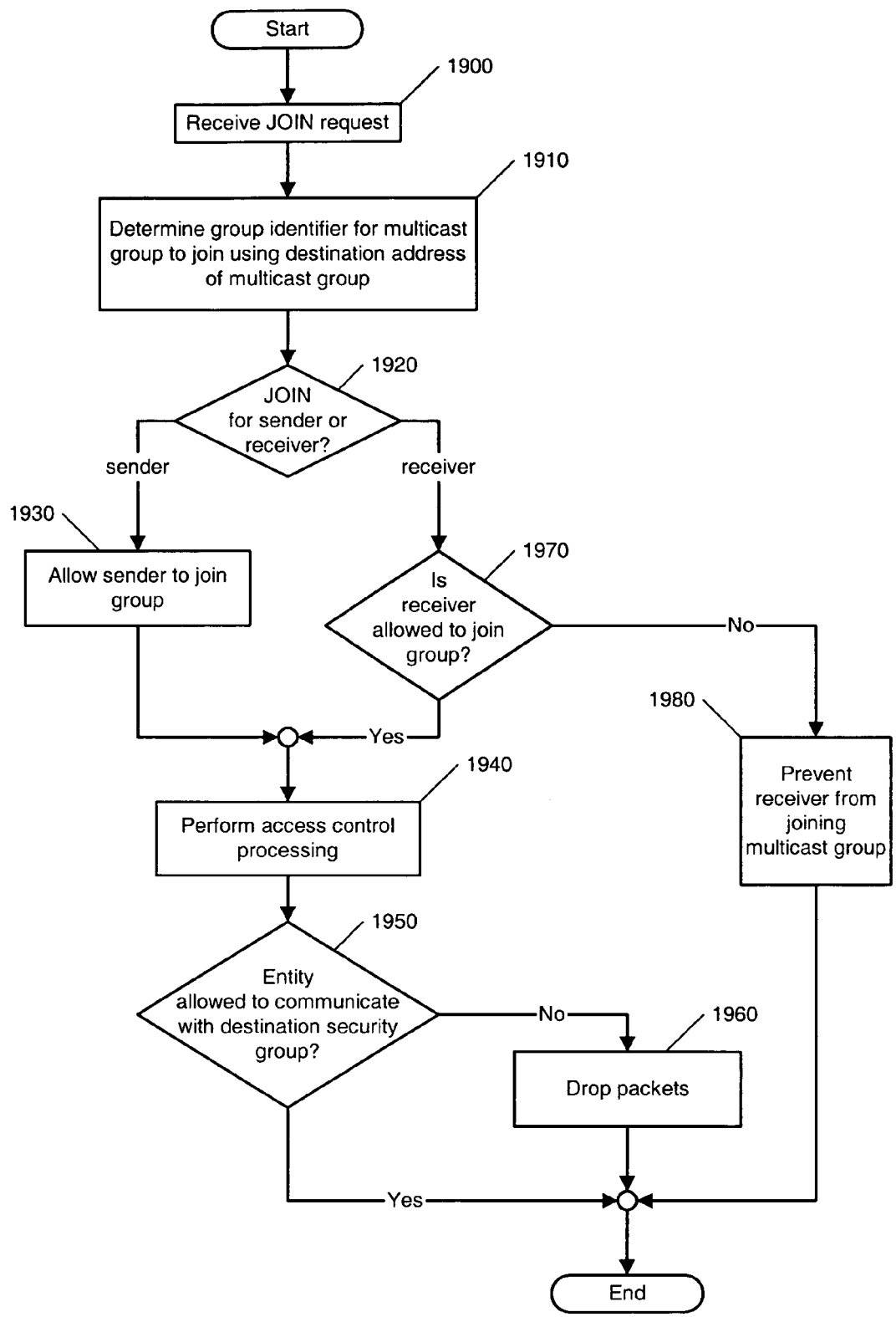
FIG. 19 is a flow diagram illustrating a process for supporting multicast functionality according to embodiments of the present invention.

FIG. 19 is a flow diagram illustrating a process for supporting multicast functionality according to embodiments of the present invention. The process begins with receipt of a JOIN request (step 1900). Once the JOIN request has been received, a determination is made as to the security group identifier for the multicast group to be joined using the destination address of the multicast group (step 1910). Once the multicast group's security group identifier has been determined, a determination is made as to whether the JOIN received is for a sender or a receiver making application to the multicast group (step 1920).

If the JOIN is for a sender, the sender is allowed to join the multicast group (step 1930). At this point, access control processing is performed (step 1940). Once the sender has joined the multicast group, access control processing (using the role-based access control techniques discussed elsewhere herein) is performed to determined whether the given entity is allowed to communicate with the destination security group (step 1950). If the entity is allowed to communicate with the destination security group, the packet(s) are passed to the multicast group and the process concludes. However, if the entity is not allowed to communicate with the destination security group, packets from the entity to the multicast group are dropped (step 1960).

If the JOIN for the multicast group is for a receiver (step 1920), a determination is made as to whether the receiver is allowed to join the multicast group (step 1970). If the receiver is not allowed to join the multicast group, the receiver is permitted from joining the multicast group (step 1980). However, if the receiver is allowed to join the multicast group, access control processing is performed on packets sent to the receiver (step 1940). A determination is then made as to whether the given sender is allowed to communicate with this receiver (step 1950). If the given sender is allowed to communicate with the receiver, communications proceed (i.e., packets are received by the receiver) and the process concludes. However, if the sender is not allowed to communicate with the receiver the packet is dropped (step 1960). The process once again concludes.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Moreover, while the invention has been particularly shown and described with reference to these specific embodiments, it will be understood by those skilled in the art that the foregoing and other changes in the form and details may be made therein without departing from the spirit or scope of the invention.

What is claimed is:

1. A method, performed by a network node configured to execute instructions stored in a memory device of said network node, the method comprising:
   determining whether an association exists, at the network node, between a destination and a reserved group identifier, wherein
      if said association exists, information indicating said association is maintained at said network node;
   if said association exists, indicating a packet received at said network node can be sent to another network node, wherein
      said packet comprises destination information that identifies said destination as a destination of said packet,
      a group identifier is assigned to a security group of a plurality of security groups,
      said destination is a member of said security group, and
      said reserved group identifier is not assigned to any of said security groups;
   if said association does not exist, determining whether another association exists, at said network node, between said destination and said group identifier, wherein
      if said another association exists, information indicating said another association is maintained at said network node; and
   if said another association exists, performing access control processing on said packet.

2. The method of claim 1, wherein
said indicating indicates that access control processing will not be performed on said packet at said network node.

3. The method of claim 2, wherein
said indicating indicates that said packet should be sent to said another network node.

4. The method of claim 3, wherein
said another network node is a next network node in a route to said destination which is to be taken by said packet.

5. The method of claim 2, further comprising:
receiving said packet at said network node; and
if said indicating indicates that said destination is associated with said reserved group identifier at said network node, sending said packet to said another network node.

6. The method of claim 5, wherein
said another network node is a next network node in a route to said destination which is to be taken by said packet.

7. The method of claim 1, wherein
said access control processing is performed using a role-based access control list.

8. The method of claim 1, further comprising:
if said destination is not associated with said group identifier at said network node, performing said indicating.

9. The method of claim 1, wherein said group identifier is one of a plurality of group identifiers, and further comprising:
determining if said destination is associated with any of said group identifiers at said network node, wherein
said group identifiers are other than said reserved group identifier; and
if said destination is associated with none of said group identifiers at said network node, performing said indicating.

10. The method of claim 1, further comprising:
determining if said destination is associated with a null group identifier at said network node, wherein
said null group identifier is other than said group identifier and said reserved group identifier; and
if said destination is associated with said null group identifier at said network node, dropping said packet.

11. The method of claim 1, further comprising:
if said network node is an egress node and said destination is not associated with any of said group identifiers at said network node,
requesting said group identifier, wherein
said destination is a member of a group identified by said group identifier;
receiving said group identifier; and
associating said destination with said group identifier at said network node.

12. The method of claim 11, further comprising:
if said group identifier is a member of a super-group, associating said destination with a super-group identifier at said network node, wherein
said super-group comprises at least two of the security groups of the plurality of security groups.

13. A computer program product comprising:
a first set of instructions, executable from a memory device of a computer system, configured to determine whether an association exists, at a network node, between a destination and a reserved group identifier, wherein
if said associate exists, information indicating said association is maintained at said network node;
a second set of instructions, executable from a memory device of said computer system, configured to indicate a packet received at a network node can be sent to another network node, if said association exists, wherein
said packet comprises destination information that identifies said destination as a destination of said packet,
a group identifier is assigned to a security group of a plurality of security groups, said destination is a member of said security group, and
said reserved group identifier is not assigned to any of said security groups;
a third set of instructions, executable from a memory device of said computer system, configured to determine, if said association does not exist, whether another association exists, at said network node, between said destination and said group identifier, wherein
if said another association exists, information indicating said another association is maintained at said network node;
a fourth set of instructions, executable from a memory device of said computer system, configured to perform access control processing on said packet, if said another association exists; and
computer readable storage media, wherein said computer program product is encoded in said computer readable storage media.

14. The computer program product of claim 13, wherein
said second set of instructions is configured to indicate that access control processing will not be performed on said packet at said network node.

15. The computer program product of claim 14, wherein
said second set of instructions is configured to indicate that said packet should be sent to said another network node.

16. The computer program product of claim 15, wherein
said another network node is a next network node in a route to said destination which is to be taken by said packet.

17. The computer program product of claim 14, further comprising:
a fifth set of instructions, executable from a memory device of said computer system, configured to
receive said packet at said network node; and
a sixth set of instructions, executable from a memory device of said computer system, configured to send said packet to said another network node, if said second set of instructions indicate that said destination is associated with said reserved group identifier at said network node.

18. The computer program product of claim 17, wherein
said another network node is a next network node in a route to said destination which is to be taken by said packet.

19. The computer program product of claim 13, wherein
said fourth set of instructions use a role-based access control list.

20. The computer program product of claim 13, further comprising:
a sixth set of instructions, executable from a memory device of said computer system, configured to cause said second set of instructions to be executed, if said destination is not associated with said group identifier at said network node.

21. The computer program product of claim 13, wherein
said group identifier is one of a plurality of group identifiers, further comprising:
a fifth set of instructions, executable from a memory device of said computer system, configured to determine if said destination is associated with a null group identifier at said network node, wherein
said null group identifier is other than said group identifier and said reserved group identifier; and
a sixth set of instructions, executable from a memory device of said computer system, configured to drop said packet, if said destination is associated with said null group identifier at said network node.

22. The computer program product of claim 13, wherein said group identifier is one of a plurality of group identifiers, further comprising:
a fifth set of instructions, executable from a memory device of said computer system, configured to determine if said destination is associated with any of said group identifiers at said network node, wherein
said group identifiers are other than said reserved group identifier; and
a sixth set of instructions, executable from a memory device of said computer system, configured to cause said second set of instructions to be executed, if said destination is associated with none of said group identifiers at said network node.

23. An apparatus comprising:
a memory device;
means for determining whether an association exists, at a network node, between a destination and a reserved group identifier, wherein
if said association exists, information indicating said association is maintained at said memory at said network node;
means for indicating a packet received at a network node can be sent to another network node, if association exists, wherein
said packet comprises destination information that identifies said destination as a destination of said packet,
a group identifier is assigned to a security group of a plurality of security groups,
said destination is a member of said security group, and
said reserved group identifier is not assigned to any of said security groups;
means for determining whether another association exists, at said network node, between said destination and said group identifier, wherein
if said another association exists, information indicating said another association is maintained at said network node; and
means for performing access control processing on said packet, if said another association exists.

24. The apparatus of claim 23, wherein
said means for indicating is configured to indicate that access control processing will not be performed on said packet at said network node.

25. The apparatus of claim 24, wherein
said means for indicating is configured to indicate that said packet should be sent to said another network node.

26. The apparatus of claim 25, wherein
said another network node is a next network node in a route to said destination which is to be taken by said packet.

27. The apparatus of claim 24, further comprising:
means for receiving said packet at said network node; and
means for sending said packet to said another network node, if said means for indicating indicates that said destination is associated with said reserved group identifier at said network node.

28. The apparatus of claim 27, wherein
said another network node is a next network node in a route to said destination which is to be taken by said packet.

29. The apparatus of claim 23, wherein
said access control processing is performed using a role-based access control list.

30. The apparatus of claim 23, further comprising:
means for causing said means for indicating to indicate said packet can be sent to said another network node, if said destination is not associated with said group identifier at said network node.

31. The apparatus of claim 23, wherein said group identifier is one of a plurality of group identifiers, and further comprising:
means for determining if said destination is associated with any of said group identifiers at said network node, wherein
said group identifiers are other than said reserved group identifier; and
means for causing said means for indicating to indicate said packet can be sent to said another network node, if said destination is associated with none of said group identifiers at said network node.

32. The apparatus of claim 23, further comprising:
means for determining if said destination is associated with a null group identifier at said network node, wherein
said null group identifier is other than said group identifier and said reserved group identifier; and
means for dropping said packet, if said destination is associated with said null group identifier at said network node.

33. A method, performed by a network node configured to execute instructions stored in a memory device of said network node, the method comprising:
receiving a group identifier;
determining, at the network node, if an association between a destination and another group identifier exists, wherein
if said association exists, said association is maintained at said network node, and
said group identifier and said another group identifier are different from one another; and
if said destination is associated with said another group identifier at said network node, associating said destination with a reserved group identifier in place of said another group identifier at said network node, wherein
said group identifier is assigned as a group identifier of a first security group of a plurality of security groups,
said another group identifier is assigned as a group identifier of a second security group of the plurality of security groups, and
said reserved group identifier is not assigned to any of said security groups.

34. The method of claim 33, further comprising:
if said destination is associated with said another group identifier at said network node, disassociating said destination from said another group identifier at said network node.

35. The method of claim 33, further comprising:
if said destination is associated with said another group identifier at said network node, and said group identifier and said another group identifier are in a super-group, associating said destination with a super-group identifier at said network node, wherein
said super-group comprises at least two of the security groups of the plurality of security groups.

36. The method of claim 33, further comprising:
determining if said destination is associated with any of a plurality of group identifiers at said network node, wherein
said group identifiers comprise said group identifier and said another group identifier.

37. The method of claim 36, further comprising:
if said destination is associated with none of said group identifiers at said network node, associating said destination with said group identifier at said network node.

38. The method of claim 36, further comprising:
if said destination is associated with one of said group identifiers at said network node and said one of said group identifiers is other than said group identifier, performing said associating said destination with said reserved group identifier at said network node.

39. The method of claim 36, wherein
said destination is a destination of a route.

40. The method of claim 36, wherein
if said destination is associated with a plurality of said group identifiers at said network node and each of said plurality of said group identifiers is in a super-group, associating a super-group identifier with said destination at said network node.

41. The method of claim 33, further comprising:
if said destination is not associated with said another group identifier at said network node, associating said group identifier with said destination.

42. The method of claim 41, further comprising:
if said destination is not associated with said another group identifier at said network node and said group identifier is in a super-group, associating said destination with a super-group identifier at said network node.

43. The method of claim 41, further comprising:
determining if said destination is associated with said reserved group identifier at said network node; and
if said destination is associated with said reserved group identifier at said network node, indicating a packet received at a network node can be sent to another network node, wherein
said packet comprises destination information that identifies said destination as a destination of said packet.

44. The method of claim 43, wherein
said indicating indicates that access control processing will not be performed on said packet at said network node.

45. The method of claim 44, further comprising:
receiving said packet at said network node; and
if said indicating indicates that said destination is associated with said reserved group identifier at said network node, sending said packet to said another network node.

46. The method of claim 43, further comprising:
determining if said destination is associated with one of a plurality of group identifiers at said network node, wherein
said one of a plurality of group identifiers is other than said reserved group identifier.

47. The method of claim 46, further comprising:
if said destination is associated with said one of a plurality of group identifiers at said network node, performing access control processing on said packet.

48. The method of claim 47, further comprising:
if said destination is not associated with said one of a plurality of group identifiers at said network node, performing said indicating.

49. A computer program product comprising:
a first set of instructions, stored in a memory device, executable on a computer system, configured to receive a group identifier;
a second set of instructions, stored in the memory device, executable on said computer system, configured to determine, at a network node, if an association between a destination and another group identifier exists, wherein
if said association exists, said association is maintained at said network node, and
said group identifier and said another group identifier are different from one another;
a third set of instructions, stored in the memory device, executable on said computer system, configured to associate said destination with a reserved group identifier in place of said another identifier at said network node, if said destination is associated with said another group identifier at said network node, wherein
said group identifier is assigned as a group identifier of a first security group of a plurality of security groups,
said another group identifier is assigned as a group identifier of a second security group of the plurality of security groups, and
said reserved group identifier is not assigned to any of said security groups; and
wherein said computer program product is encoded in the memory device.

50. The computer program product of claim 49, further comprising:
a fourth set of instructions, executable on said computer system, configured to determine if a destination is associated with any of a plurality of group identifiers at said network node, wherein
said group identifiers comprise said group identifier and said another group identifier.

51. The computer program product of claim 50, further comprising:
a fifth set of instructions, executable on said computer system, configured to associate said destination with said group identifier at said network node, if said destination is associated with none of said group identifiers at said network node.

52. The computer program product of claim 50, further comprising:
a fifth set of instructions, executable on said computer system, configured to cause said
third set of instructions to be executed, if said destination is associated with one of said group identifiers at said network node and said one of said group identifiers is other than said group identifier.

53. The computer program product of claim 49, further comprising:
a fourth set of instructions, executable on said computer system, configured to associate said destination with said group identifier at said network node, if said destination is not associated with said another group identifier at said network node.

54. The computer program product of claim 53, further comprising:
a fifth set of instructions, executable on said computer system, configured to determine if said destination is associated with said reserved group identifier at said network node; and
a sixth set of instructions, executable on said computer system, configured to indicate a packet received at a network node can be sent to another network node, if said destination is associated with said reserved group identifier at said network node, wherein
said packet comprises destination information that identifies said destination as a destination of said packet.

55. The computer program product of claim 54, wherein
said sixth set of instructions indicate that access control processing will not be performed on said packet at said network node.

56. The computer program product of claim 55, further comprising:
  a seventh set of instructions, executable on said computer system, configured to receive said packet at said network node; and
  a eighth set of instructions, executable on said computer system, configured to send said packet to said another network node, if said sixth set of instructions indicate that said destination is associated with said reserved group identifier at said network node.

57. The computer program product of claim 54, further comprising:
  a seventh set of instructions, executable on said computer system, configured to determine if said destination is associated with one of a plurality of group identifiers at said network node, wherein
    said one of a plurality of group identifiers is other than said reserved group identifier.

58. The computer program product of claim 57, further comprising:
  a eighth set of instructions, executable on said computer system, configured to perform access control processing on said packet, if said destination is associated with said one of a plurality of group identifiers at said network node.

59. The computer program product of claim 58, further comprising:
  a ninth set of instructions, executable on said computer system, configured to cause said sixth set of instructions to be executed, if said destination is not associated with said one of a plurality of group identifiers at said network node.

60. An apparatus comprising:
  a memory device;
  means for receiving a group identifier;
  means for determining, at a network node, if an association between a destination and another group identifier exists, wherein
    if said association exists, said association is maintained in said memory device at said network node, and
    said group identifier and said another group identifier are different from one another; and
  means for associating said destination with a reserved group identifier in place of said another group identifier at said network node, if said destination is associated with said another group identifier at said network node, wherein
    said group identifier is assigned as a group identifier of a first security group of a plurality of security groups,
    said another group identifier is assigned as a group identifier of a second security group of the plurality of security groups, and
    said reserved group identifier is not assigned to any of said security groups.

61. The apparatus of claim 60, further comprising:
  means for determining if said destination is associated with any of a plurality of group identifiers at said network node, wherein
    said group identifiers comprise said group identifier and said another group identifier.

62. The apparatus of claim 61, further comprising:
  means for associating said destination with said group identifier at said network node, if said destination is associated with none of said group identifiers at said network node.

63. The apparatus of claim 61, further comprising:
  means for performing said associating said destination with said reserved group identifier at said network node, if said destination is associated with one of said group identifiers at said network node and said one of said group identifiers is other than said group identifier.

64. The apparatus of claim 60, further comprising:
  means for associating said destination with said group identifier at said network node, if said destination is not associated with said another group identifier at said network node.

65. The apparatus of claim 64, further comprising:
  means for determining if said destination is associated with said reserved group identifier at said network node; and
  means for indicating a packet received at a network node can be sent to another network node, if said destination is associated with said reserved group identifier at said network node, wherein
    said packet comprises destination information that identifies said destination as a destination of said packet.

66. The apparatus of claim 65, wherein
  said means for indicating is configured to indicate that access control processing will not be performed on said packet at said network node.

67. The apparatus of claim 66, further comprising:
  means for receiving said packet at said network node; and
  means for sending said packet to said another network node, if said means for indicating indicates that said destination is associated with said reserved group identifier at said network node.

68. The apparatus of claim 65, further comprising:
  means for determining if said destination is associated with one of a plurality of group identifiers at said network node, wherein
    said one of a plurality of group identifiers is other than said reserved group identifier.

69. The apparatus of claim 68, further comprising:
  means for performing access control processing on said packet, if said destination is associated with said one of a plurality of group identifiers at said network node.

70. The apparatus of claim 69, further comprising:
  means for performing said indicating, if said destination is not associated with said one of a plurality of group identifiers at said network node.

* * * * *